(12) United States Patent
Farshori

(10) Patent No.: US 11,532,014 B2
(45) Date of Patent: *Dec. 20, 2022

(54) AUGMENTED REALITY SHOPPING DISPLAYS

(71) Applicant: AT&T Mobility II LLC, Atlanta, GA (US)

(72) Inventor: Mohammed Salman Farshori, Plano, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,568

(22) Filed: Aug. 9, 2019

(65) Prior Publication Data
US 2019/0362381 A1    Nov. 28, 2019

Related U.S. Application Data

(63) Continuation of application No. 14/481,209, filed on Sep. 9, 2014, now Pat. No. 10,387,912.

(51) Int. Cl.
| | |
|---|---|
| G06Q 30/00 | (2012.01) |
| G06Q 30/02 | (2012.01) |
| G06Q 30/06 | (2012.01) |
| G06T 19/00 | (2011.01) |

(52) U.S. Cl.
CPC ..... *G06Q 30/0253* (2013.01); *G06Q 30/0267* (2013.01); *G06Q 30/0633* (2013.01); *G06T 19/006* (2013.01); *G06T 2200/24* (2013.01)

(58) Field of Classification Search
CPC ........... G06Q 30/0253; G06Q 30/0633; G06Q 30/0267; G06T 19/006; G06T 2200/24
See application file for complete search history.

(56) References Cited

U.S. PATENT DOCUMENTS

| | | | |
|---|---|---|---|
| 7,707,073 B2 * | 4/2010 | Bloebaum | H04W 4/80 705/26.8 |
| 8,606,645 B1 | 12/2013 | Applefeld | |
| 8,626,611 B2 | 1/2014 | Bravo | |
| 9,053,483 B2 * | 6/2015 | Geisner | G02B 27/017 |
| 2003/0009393 A1 | 1/2003 | Norris | |
| 2007/0203791 A1 | 8/2007 | Kohl et al. | |
| 2008/0262928 A1 | 10/2008 | Michaelis | |

(Continued)

OTHER PUBLICATIONS

"Method and System for Augmented Reality Markers per Aisle at Retail Stores", ip.com, Mar. 25, 2012. (Year: 2012).*

(Continued)

*Primary Examiner* — Yehdega Retta
(74) *Attorney, Agent, or Firm* — Hartman & Citrin LLC

(57) ABSTRACT

Concepts and technologies are disclosed herein for providing augmented reality shopping displays. A processor can execute a shopping service. The processor can receive a request for display data. The processor can analyze shopping data to identify data sources, the shopping data can include user data associated with the requestor, and the data sources can include an offer source. The processor can obtain collected data from the data sources identified, the collected data including an offer. The processor can generate display data based upon the collected data and the shopping data, and provide the display data to a user device. The display data can identify the offer.

20 Claims, 15 Drawing Sheets

(56) References Cited

U.S. PATENT DOCUMENTS

| | | |
|---|---|---|
| 2009/0171688 A1 | 7/2009 | Ikeda |
| 2012/0116920 A1* | 5/2012 | Adhikari .................. G09G 5/00 705/26.61 |
| 2012/0123674 A1* | 5/2012 | Perks ................. G06Q 30/0631 701/426 |
| 2012/0239504 A1 | 9/2012 | Curlander et al. |
| 2013/0030915 A1 | 1/2013 | Statler et al. |
| 2013/0073388 A1 | 3/2013 | Heath |
| 2013/0138534 A1 | 5/2013 | Herwig |
| 2013/0144708 A1 | 6/2013 | Williams et al. |
| 2013/0159081 A1 | 6/2013 | Shastry |
| 2013/0166386 A1 | 6/2013 | Simmons |
| 2013/0218721 A1 | 8/2013 | Borhan |
| 2013/0226915 A1 | 8/2013 | Scofield et al. |
| 2013/0257900 A1 | 10/2013 | Brahmakal et al. |
| 2013/0293530 A1* | 11/2013 | Perez ..................... G06F 3/012 345/418 |
| 2013/0325653 A1* | 12/2013 | Ouimet ..................... G06F 7/08 705/26.7 |
| 2014/0067564 A1 | 3/2014 | Yuan |
| 2014/0100994 A1 | 4/2014 | Tatzel et al. |
| 2014/0129393 A1* | 5/2014 | Soon-Shiong ..... G06Q 30/0633 705/27.2 |
| 2014/0214547 A1 | 7/2014 | Signorelli |
| 2014/0214600 A1 | 7/2014 | Argue et al. |
| 2014/0337174 A1 | 11/2014 | Lin |
| 2014/0379529 A1 | 12/2014 | Agasti |

OTHER PUBLICATIONS

Huhn et al., "On the Use of Virtual Environments for the Evaluation of Location-Based Applications," Proceedings of the SIGCHI Conference on Human Factors in Computing Systems, May 5-10, 2012, ACM.

Ho et al., "An Open Platform for Location-Aware Services Development and Sensor Data Collection," downloaded at http://www.iis.sinica.edu.tw/papers/mcc/13099-F.pdf on Aug. 25, 2014.

Chris Parsons, "Valpak launches location based coupons with Junaio augmented reality," androidcentral, Mar. 29, 2011, retrieved at http://www.androidcentral.com/valpak-launches-location-based-coupons-junaio-augmented-reality on Aug. 6, 2014.

U.S. Office Action dated Feb. 6, 2017 in U.S. Appl. No. 14/481,209.
U.S. Office Action dated Jul. 19, 2017 in U.S. Appl. No. 14/481,209.
U.S. Office Action dated May 3, 2018 in U.S. Appl. No. 14/481,209.
U.S. Office Action dated Nov. 30, 2018 in U.S. Appl. No. 14/481,209.
U.S. Notice of Allowance dated Mar. 27, 2019 in U.S. Appl. No. 14/481,209.

* cited by examiner

AUGMENTED REALITY SHOPPING DISPLAYS

CROSS-REFERENCE TO RELATED APPLICATIONS

This application is a continuation of and claims priority to U.S. patent application Ser. No. 14/481,209, entitled "Augmented Reality Shopping Displays," filed Sep. 9, 2014, now U.S. Pat. No. 10,387,912, which is incorporated herein by reference in its entirety.

BACKGROUND

Over the past several years, the average mobile device used by consumers has evolved from a simple feature phone that may support only basic talk and text features into an advanced Internet-capable device that may almost always be connected to the Internet. Over the same time, the shopping experience for most consumers has remained somewhat consistent. Although some modern consumers may use mobile devices to check prices for products or to find information relating to products, these types of activities may sometimes be frowned upon by retail location personnel. In particular, shoppers may scan items to find a better price online, thereby placing retail locations at a disadvantage. As such, some retailers may not encourage users to interact with mobile devices during shopping expeditions.

Some modern consumers may use mobile devices to track shopping lists. While these consumers may rely on electronic shopping list solutions, these shopping list solutions may be lacking in various ways. First, consumers must create the lists ahead of time and therefore the electronic shopping lists may differ from traditional pen-and-paper shopping lists only with regard to preventing waste. Second, consumers must remember to view the list in the store or other retail location to take advantage of the electronic list. Still further, consumers may want to check prices associated with items on a shopping list. Doing so, however, may require the consumers to exit the shopping list application to access price check functionality. This can be time consuming and frustrating for some consumers.

Consumers sometimes may look for bargains at home, in published circulars, or in-store by obtaining coupon offers and/or searching the shelves for coupons or other promotional offers. When shopping, these consumers may be required to navigate the store to find bargains listed in these sources. Furthermore, consumers may not recognize deals or bargains based upon where the items are located. For example, an item on sale may be located in a special promotion area, while the regularly-priced items may be located elsewhere. As a result, a consumer may not be aware of the promotion and therefore may forego a purchase at a particular time or obtain the item elsewhere.

SUMMARY

The present disclosure is directed to generating and providing augmented reality shopping displays. According to some embodiments of the concepts and technologies described herein, a server computer can execute a shopping service and a user device can execute a shopping application. In some other embodiments, one of the user device and/or the server computer can execute functionality associated with both the shopping application and the shopping service. According to various embodiments of the concepts and technologies described herein, a shopping list can be created. In some instances, the shopping list can be created at and/or accessed by the user device, though this is not necessarily the case.

The user device may be used during shopping. For example, the user device may be used to scan items to obtain information relating to products, to perform searches, to purchase items, to navigate through a store, combinations thereof, or the like. The shopping application can provide these and other functions, as well as the functionality illustrated and described herein for creating a shopping list and/or shopping for items or services on the shopping list.

According to some embodiments, the user device can generate user data, which can be used to provide the functionality illustrated and described herein. The user data can include object data. The object data can relate to one or more items, products, services, or the like that may be interacted with during a shopping outing. The user data also can include one or more preferences associated with the shopping application and/or a shopping service. The user data also can include shopping list data, which can relate to a shopping list and/or shopping list items. For example, the shopping list data can identify one or more objects, or the like. The user data also can include compatibility data. The compatibility data can relate to the user, the user device, a vehicle, an office, a home, a room, or the like, and can indicate whether or not a particular item is compatible with indicated user preferences or needs. The user data also can include orientation data. The orientation data can define an orientation and/or location of the user device. The user data also can include communications information such as data identifying communications that may include an item reference, or the like. The user data can include other data and/or combinations of the data described herein, in some embodiments.

The user device can obtain the various data included in the user data and package the user data in a particular format. The user device can transmit the user data to the shopping service, in some embodiments. In some other embodiments, the user device can store and/or use the user data at the user device instead of transmitting the user data. In some other embodiments, the shopping service can obtain the user data. The shopping service also can be configured to collect data ("collected data") from one or more data sources. The data sources can include, for example, promotion sources, offer sources, location services, communication sources, or the like.

The shopping service can analyze the user data and the collected data to create shopping data. The shopping data can represent the user data, history information, the collected data, other data, and the like. The shopping data can be used to generate one or more purchase alternatives for items represented by the object data; to identify promotions relating to items represented by the object data; to determine purchase histories and/or trends associated with users, devices, locations, or the like; and/or for other purposes. The shopping service can generate display data and provide the display data to the user device for presentation at the user device. In some other embodiments, the user device can obtain the collected data from the shopping service and generate the display data at the user device. Regardless of where the display data is generated, the user device can present one or more displays at the user device. The displays can be used during shopping to provide various functions and/or enhancements for a user or other entity. Some of these functions and/or enhancements are illustrated and described herein.

According to various embodiments of the concepts and technologies described herein, the displays can be used to guide users through a store or other environment to find a product, object, item, service, or the like on a shopping list. Because the user device and/or the server computer can communicate with backend systems of a retail location or retailer, the location of items may be kept updated. Thus, if items are moved for sales or other purposes, the concepts and technologies described herein can be used to locate the items without additional effort on the part of the user.

The displays also can be used to present one or more promotions relating to one or more items on a shopping list. The promotions also can relate to items not on a shopping list. For example, the concepts and technologies described herein can be used to enable a store to push promotions to the user device when the user device arrives at or near a store. The promotions also can be identified and provided to the user or to the shopping service if the history information indicates that the item may be of interest to the user or other entity, and/or at other times.

The displays also can provide purchase options to a user during a shopping service. Thus, a promotional sale, new product, or other item may be offered to the user during the shopping experience using the concepts and technologies described herein. The displays also can indicate that an item reference or product reference has been detected at the user device or elsewhere. For example, if an email, text message, or other communication mentioning a product or item is received at the user device or elsewhere, the shopping application and/or the shopping service may identify an item reference in the communication and inform the user. The displays also can present compatibility information. The compatibility information can relate to a user, a user device, a vehicle associated with the user, an office, home, room, or other entity or location associated with the user, combinations thereof, or the like. Thus, embodiments of the concepts and technologies described herein can be used to simplify a shopping experience for a user or other entity.

According to one aspect of the concepts and technologies disclosed herein, a method is disclosed. The method can include receiving, at a processor executing a shopping service, a request for display data. The processor can analyze shopping data to identify data sources. The shopping data can include user data associated with the requestor, and the data sources can include an offer source. The processor can obtain collected data from the data sources identified. The collected data can include an offer. The processor can generate display data based upon the collected data and the shopping data, and provide the display data to a user device. The display data can identify the offer.

In some embodiments, the user data can include object data that can identify an object associated with an interaction by the user device. In some embodiments, the object can include an object on a shopping list, and the interaction can include a purchase of the object. The interaction can include displaying an augmented reality display that can include a reference to the object, and the display data can include a user interface element that can include a virtual shelf. The virtual shelf, in some embodiments, can include the reference to the object.

In some embodiments, the virtual shelf can be displayed by the user device, and a product alternative can be displayed on the virtual shelf. The object can include an object that is not on a shopping list, and the interaction can include obtaining a promotion relating to the object. In some embodiments, the object data can identify an item reference included in a communication sent to the user device. In some embodiments, the user data can include compatibility data associated with a user. The compatibility data can identify a vehicle associated with the user. In some other embodiments, the compatibility data can identify dimensions of a structure associated with the user.

According to another aspect of the concepts and technologies disclosed herein, a system is disclosed. The system can include a processor and a memory. The memory can store computer-executable instructions that, when executed by the processor, cause the processor to perform operations. The operations can include receiving a request for display data and analyzing shopping data. The shopping data can include user data associated with a requestor and the data sources can include an offer source. The operations further can include obtaining collected data from the data sources identified. The collected data can include an offer. The operations also can include generating display data based upon the collected data and the shopping data, and providing the display data to a user device. The display data can identify the offer.

In some embodiments, the user data can include object data. The object data can identify an object on a shopping list, and the object can be associated with a purchase. In some embodiments, the user data can include object data that can identify an object associated with an interaction at the user device. The interaction can include displaying an augmented reality display. The augmented reality display can include a reference to the object, and the display data can include a user interface element that can include a virtual shelf. The virtual shelf can include the reference.

In some embodiments, the user data can include compatibility data associated with a user. The compatibility data can identify dimensions of an entity associated with the user. In some embodiments, the user data can include preferences associated with a shopping service, shopping list data, and orientation data. The orientation data can define a geographic location of the user device and an orientation of the user device at the geographic location. In some embodiments, the shopping data can include history information. The history information can identify a purchase history associated with a geographic location, and can be used to identify the offer source.

According to yet another aspect, a computer storage medium is disclosed. The computer storage medium can have computer-executable instructions stored thereon that, when executed by a processor, cause the processor to perform operations. The operations can include receiving, from a requestor, a request for display data, and analyzing the shopping data. The shopping data can include user data associated with the requestor and the data sources can include an offer source. The operations also can include obtaining collected data from the data sources identified. The collected data can include an offer. The operations also can include generating display data based upon the collected data and the shopping data, and providing the display data to a user device. The display data can identify the offer.

In some embodiments, the user data can include object data that can identify an object associated with an interaction at the user device. The interaction can include displaying an augmented reality display that can include a reference to the object. The display data can include a user interface element including a virtual shelf that can include the reference. In some embodiments, the user data can include compatibility data associated with a user, and the compatibility data can identify dimensions of an entity associated with the user. In some embodiments, the user data can include preferences associated with a shopping service, shopping list data, compatibility data associated with the user device, and orientation data. The orientation data can define a geographic location of the user device and an orientation of the user device at the geographic location.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
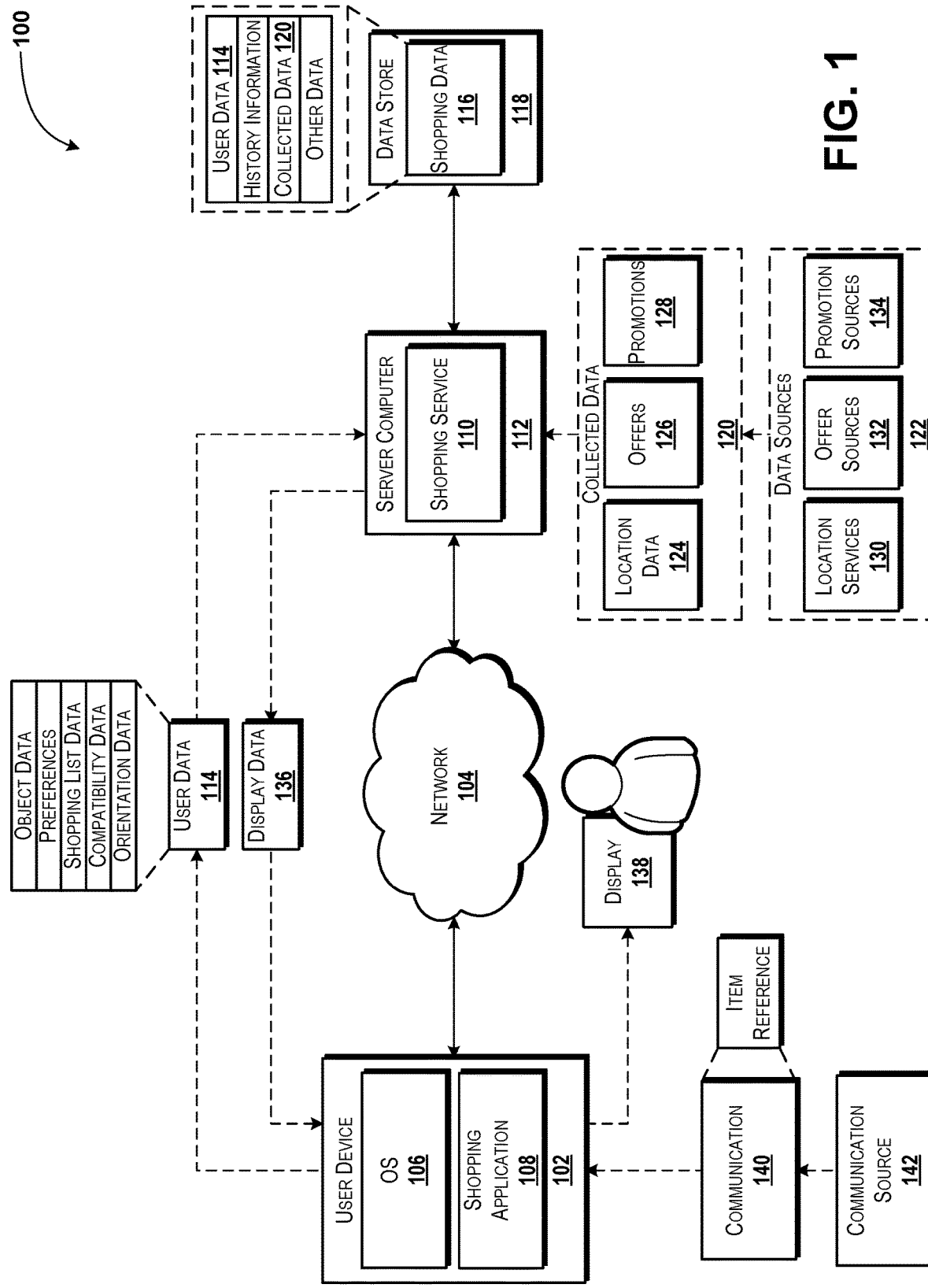
FIG. 1 is a system diagram illustrating an illustrative operating environment for various embodiments of the concepts and technologies described herein.

The following detailed description is directed to generating and/or presenting augmented reality shopping displays. According to some embodiments of the concepts and technologies described herein, a user device can execute a shopping application and a server computer can execute a shopping service. A shopping list can be created at the user device or otherwise accessed by the user device. The user device may be used during shopping. For example, the user device may be used to scan items to obtain information, to perform searches, to purchase items, to navigate through a store, combinations thereof, or the like. The shopping application can provide the functionality illustrated and described herein for creating a shopping list and/or shopping for items or services on the shopping list.

According to some embodiments, the user device can generate user data. The user data can include object data. The object data can relate to one or more items, products, services, or the like interacted with during a shopping outing. The user data also can include one or more preferences associated with the shopping application and/or a shopping service. The user data also can include shopping list data relating to a shopping list and/or shopping list items. The user data also can include compatibility data. The compatibility data can relate to the user, the user device, a vehicle, an office, a home, a room, or the like. The user data also can include orientation data that can define an orientation and/or location of the user device. The user data also can include communications information and/or other data, as well as combinations of one or more of the data illustrated and described herein. The user device can transmit the user data to the shopping service, in some embodiments. In some embodiments, the user device can store and/or use the user data at the user device. In some other embodiments, the shopping service can obtain the user data and can collect data from one or more data sources such as promotion sources, offer sources, location services, communication sources, or the like.

The shopping service can analyze the user data and the collected data to create shopping data. The shopping data can represent the user data, history information, the collected data, other data, and the like, and can be used to identify one or more purchase alternatives to items on a shopping list or items interacted with by the user device; to identify one or more promotions for items interacted with and/or items on a shopping list; to determine purchase histories and/or trends associated with items, users, locations, or the like; and/or for other purposes. The shopping service can generate display data and provide the display data to the user device for presentation at the user device and/or for use in generating one or more displays. In some other embodiments, the user device can obtain the collected data from the shopping service and generate the display data at the user device. Regardless of where the display data is generated, the user device can present one or more displays at the user device. The displays can be used during shopping to provide various functions and/or enhancements for a user or other entity.

According to various embodiments of the concepts and technologies described herein, the displays can be used to guide users through a store or other environment to find a product, object, item, service, or the like on a shopping list. The displays also can present one or more promotions relating to one or more items on a shopping list. The promotions also can relate to items not on a shopping list, for example where a store may push the promotions to the user device when the user device arrives at or near a store, where a history indicates that the item may be of interest to the user or other entity, and/or at other times. The displays also can provide purchase options to a user during a shopping service. The displays also can indicate that an item reference or product reference has been detected at the user device or elsewhere. The displays also can present compatibility information. The compatibility information can relate to a user, a user device, a vehicle associated with the user, an office, home, room, or other entity or location associated with the user, combinations thereof, or the like. Thus, embodiments of the concepts and technologies described herein can be used to simplify a shopping experience for a user or other entity.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for augmented reality shopping displays will be described, according to an illustrative embodiment. The operating environment 100 shown in FIG. 1 includes a user device 102. In some embodiments, the user device 102 can operate in communication with and/or as part of a communications network ("network") 104. It should be understood, however, that the user device 102 also can provide some of the functionality described herein without communicating via the network 104.

According to various embodiments, the functionality of the user device 102 may be provided by one or more server computers, personal digital assistants ("PDAs"), tablet computers, slate computers, smart watches, smart glasses (e.g., the GOOGLE GLASS family of products), mobile media devices, mobile telephones, laptop computers, smartphones, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106, one or more application programs (not shown in FIG. 1), and one or more application programs such as, for example, a shopping application 108. The operating system 106 is a computer program for controlling the operation of the user device 102. The application programs and/or the shopping application 108 can include executable programs configured to execute on top of the operating system 106 to provide various functions illustrated and described herein for generating, providing, presenting, obtaining data for, and/or using augmented reality shopping displays. In some embodiments, the application programs can include, but are not limited to, web browsers, web applications, mail applications, native applications, media applications, camera and/or video applications, combinations thereof, or the like. Because various embodiments of application programs are generally known, the application programs are not described in additional detail herein.

The shopping application 108 can be configured to provide the functionality described herein for providing augmented reality shopping displays. As such, the shopping application 108 can be configured to store, access, and/or capture various types of data that can be used to provide the functionality illustrated and described herein. In some embodiments, the shopping application 108 can generate the augmented reality shopping displays, while in some other embodiments, the shopping application 108 can interact with other devices, services, applications, and/or other entities to obtain data for the augmented reality shopping displays. These embodiments will be illustrated and described in more detail below.

According to various embodiments, the shopping application 108 can support interactions for obtaining preferences, settings, and/or options for providing and/or using augmented reality shopping displays. The shopping application 108 also can support operations for creating, maintaining, accessing, and/or updating shopping lists that may be used during shopping and/or in conjunction with augmented reality shopping displays. The shopping application 108 also can obtain, present, and/or support the use of promotions, as well as representing the promotions in conjunction with augmented reality shopping displays as illustrated and described herein. The shopping application 108 also can identify, collect, and/or present purchase options to users, for example as part of augmented reality shopping displays. The shopping application 108 also can be configured to determine compatibility of various items or products with users, rooms, vehicles, buildings, combinations thereof, or the like. These and other functions of the shopping application 108 will be illustrated and described in more detail below.

As explained above, the shopping application 108 can provide the functionality illustrated and described herein and/or can interact with other devices, applications, and/or services to provide the functionality illustrated and described herein. According to various embodiments, including the embodiment shown in FIG. 1, the shopping application 108 can communicate with a shopping service 110 or other software that may be hosted or executed by a computing device. In the illustrated embodiment, the shopping service 110 can be a callable service that may be hosted by a server computer 112. Because the shopping service 110 can be invoked, accessed, and/or interacted with in manners other than service calls or the like, it should be understood that the functionality of the server computer 112 may be provided by other computing devices such as laptop computers, workstations, web servers, combinations thereof, or the like. As such, it should be understood that this example is illustrative and therefore should not be construed as being limiting in any way.

The shopping service can be configured to obtain user data 114 from the user device 102, and to use the user data 114 to provide various functionality illustrated and described herein. The user data 114 can include object data, preferences, shopping list data, compatibility data, orientation data, other data (not illustrated separately in FIG. 1), combinations thereof, or the like. The object data can include information that identifies an object, product, or service that is being interacted with in some manner at or in association with the user device 102. As used herein, an "interaction" can include, but is not limited to, a scan of an object, product, or indicia relating to a service (which may occur when the user or other entity considers purchasing an item); a search relating to a particular object, product, or service; a purchase of a particular object, product, or service; adding a particular object, product, or service to a shopping list; detecting a reference or request relating to an object, product, or service at the user device 102; combinations thereof; or the like. Thus, the object data can include any information or data that can identify an object, product, item, or service that is being considered for purchase or is being purchased at or by the user device 102 and/or a user or other entity associated therewith.

The preferences can include settings, options, configurations, profiles, and/or other user-specific, device-specific, store-specific, application-specific, and/or service-specific preferences associated with the shopping application 108 and/or the shopping service 110. In various embodiments, the preferences can specify when, where, and how the user device 102 will use and/or access the shopping application 108 and/or the shopping service 110. Thus, for example, the preferences can be used to enable/disable use of store backend systems to provide guidance in stores, pricing information, coupon, sale, or other promotion information; to enable/disable the use of user profiles to determine product compatibility with particular locations, vehicles, or the like; to enable/disable the use of location information and/or location services; to enable/disable the use of communication monitoring to detect references to items, objects, products, or services relevant to the shopping application 108 and/or shopping service 110 in communications received at and/or sent by or in association with the user device 102; to enable/disable accessing online merchants and/or shopping platforms; to enable/disable the use of shopping lists; combinations thereof; or the like.

Because some features of the shopping application 108 and/or the shopping service 110 may be charged or billed separately, the preferences can be used to limit or expand the functionality of the shopping application 108 and/or the shopping service 110 for purposes of billing, if desired. Because the preferences can include other settings and/or options as illustrated and described herein, it should be understood that these examples are illustrative and therefore should not be construed as being limiting in any way.

The shopping list data can include information or data for specifying a shopping list and/or items on a shopping list. The shopping list data also can be used to modify lists (e.g., to add items to the list, to remove items from the list, or the like). The shopping list data can include data in various formats and can be used, in some embodiments, by the shopping service 110 to search for alternatives to items on the list, to search for promotions for items on the list, to generate a shopping path within a particular store or location based on items on the list, to determine compatibility and/or product information relating to items on the list, and/or for other purposes. Thus, the shopping service 110 can use the shopping list data to determine what a user may purchase, where the user may purchase those items, available promotions and/or purchase options relating to the items on the shopping list, whether or not the items are compatible with user preferences or needs, combinations thereof, or the like.

The compatibility data can include information that specifies user needs, preferences, or the like. Thus, the compatibility data can include data that can define a vehicle driven by a user and/or other entity associated with the user device 102. The use of this data is illustrated and described in more detail below, but briefly this information can be used, for example, to determine if a product being considered for purchase or being purchased can be transported home in a user's vehicle; if the product will fit in a particular home, office, or other location; or the like. The compatibility data also can indicate, for example, information relating to the user such as dietary needs or preferences (e.g., gluten-free, vegetarian, halal, kosher, fish-free, dairy-free, or the like); body dimensions (e.g., waist size, head size, or the like); and/or other user-specific information. Thus, the compatibility data can be used to determine if a product that is being purchased or considered for purchase by a user is compatible with the user's dietary needs, body dimensions, combinations thereof, or the like.

The orientation data can represent the orientation of the user device 102 at any particular moment. Thus, the orientation data can be obtained from one or more sensors such as accelerometers, location determination devices (e.g., global positioning system ("GPS") receivers, or the like), magnetometers, gyroscopes, location and/or orientation sensors or sensor arrays, combinations thereof, or the like. The orientation data also can include location data that can identify a geographic location. Thus, the orientation data can represent not only where the user device 102 is (e.g., a geographic location), but also how the user device 102 is oriented (e.g., a facing direction, an angle of incline, or the like), as well as movements of the user device 102. Thus, the shopping service 110 and/or the shopping application 108 can track movements of the user device 102 at various locations including interior spaces to determine location at any particular moment. This information may be used to generate augmented displays from the current point of view of the user device 102 and/or for other purposes as illustrated and described herein.

According to various embodiments, the shopping service 110 can be configured to obtain the user data 114, to analyze the user data 114 and/or other information obtained from other sources, and to generate shopping data 116. The shopping data 116 can represent and/or can include the user data 114. In various embodiments, the shopping data 116 can also include history information and other data as illustrated and described herein. The history information can represent trends associated with the user device 102 and/or a user thereof. The trends can include, for example, trends or histories relating to locations (e.g., businesses, offices, facilities, or the like), purchasing or shopping activities associated with the user device 102 and/or a user thereof, promotions histories, price histories, combinations thereof, or the like.

The shopping data 116 also can include or represent other data such as location data, data relating to purchase options, data relating to promotions, or the like. According to various options, the shopping service 110 can obtain or collect data ("collected data") 120 from one or more data sources 122. The collected data 120 can include, for example, location data 124, offers 126, promotions 128, and/or other information. As such, the data sources 122 can include one or more location services 130 such as location servers, network devices or the like; one or more offer sources 132 such as online marketplaces, retail location devices and/or backend systems, or the like; and one or more promotion sources 134 such as discount sites, coupon sites, sale sites, combinations thereof, or the like. These data will be described in more detail below.

The shopping service 110 can generate the shopping data 116 based upon the user data 114, the collected data 120, history information (which can be detected or generated by the shopping service 110), and/or other data. The shopping service 110 can store the shopping data 116 at a local or remote data storage device or location ("data storage location"). The data storage location can include one or more real or virtual data storage locations such as, for example, a memory, a server computer, a database, a data store, or the like. In the illustrated embodiment shown in FIG. 1, the shopping service 110 can be configured to store the shopping data 116 at a data store 118. The data store 118 can be hosted by the server computer 112 or remotely located relative to the server computer 112. According to various embodiments, the functionality of the data store 118 can be provided by one or more server computers, databases, laptop computers, memory devices, hard drives or other mass storage devices, virtual storage resources, combinations thereof, or the like.

Further description of the collected data 120 and the data sources 122 is now provided. The collected data 120 can include location data 124, which can be obtained by one or more location services 130. The location services 130 can include, for example, a location server, network hardware, location beacons, combinations thereof, or the like. The location services 130 also can include the user device 102, which may periodically or at other times report its location to the shopping service 110 and/or other entities. Thus, the location data 124 can represent the geographic location of the user device 102 to varying levels of accuracy including, but not limited to, a particular network, a particular network cell, a particular coverage area, a particular building, a particular room, or specific geographic coordinates. Because location determination and/or the varying levels of accuracy associated with various location determination techniques are generally understood, the various ways to compute location and/or the accuracy associated with these various approaches are not further described herein.

The collected data 120 also can include one or more offers 126, which may be obtained from one or more offer sources 132. The offers 126 can define prices, shipping terms, tax information, and/or other cost and/or delivery information available from an offer source 132 for a particular product, item, object, or service. Thus, the offers 126 can be obtained to determine a price, delivery time, shipping charge, and/or other time or cost for an item, product, object, or service being considered for purchase or being purchased. Thus, as will be illustrated and described in more detail herein, the shopping service 110 can obtain purchase options or alternatives for purchases being considered, for example from an online retailer for comparison purposes or for other purposes. According to various embodiments, the offer sources 132 can include websites, vendors, auction sites, distributors, private parties, combinations thereof, or the like. Because the offers 126 can come from additional and/or alternative offer sources 132, it should be understood that these examples are illustrative and therefore should not be construed as being limiting in any way.

The collected data 120 also can include one or more promotions 128, which may be obtained from one or more promotion sources 134. The promotions 128 can define coupons, sales, discount quantities, special deals, combinations thereof, or the like, from a promotion source 134 for a particular product, item, object, or service. Thus, the promotions 128 can be obtained to determine a discount or other promotion for an item, product, object, or service being considered for purchase or being purchased at the user device 102 and/or by an entity associated with the user device 102. Thus, as will be illustrated and described in more detail herein, the shopping service 110 can obtain promotions for purchases being considered. According to various embodiments, the promotion sources 134 can include discount websites, auction sites, coupon vendors, coupon circulars, vendor systems, combinations thereof, or the like. Because the promotions 128 can come from additional and/or alternative promotion sources 134, it should be understood that these examples are illustrative and therefore should not be construed as being limiting in any way.

The shopping service 110 can be configured to analyze the shopping data 116 and the collected data 120 to determine an interaction occurring at the user device 102. As noted above, the interaction can include a purchase of an item or service, consideration of a purchase, presentation and/or interaction with an augmented reality display relating to an item, adding the item or service to a shopping list, or the like. The shopping service 110 can be configured to identify other purchase options, promotions, and/or the like and provide this information to the user device 102 for consideration at the point of sale or elsewhere.

According to various embodiments, the shopping service 110 can generate display data 136 and transmit or otherwise provide the display data 136 to the user device 102. The display data 136 can represent the offers 126, the promotions 128, and/or other information such as history information, compatibility data, or the like. Thus, the shopping service 110 can, by way of creating and/or providing the display data 136 to the user device 102, provide purchase options, purchase suggestions, compatibility information, combinations thereof, or the like, to the user device 102. As explained above in detail, the shopping service 110 can be configured to merely collect the collected data 120 and/or the shopping data 116, and the shopping application 108 can be configured to provide the functionality illustrated and described herein for generating and presenting suggestions, promotions, purchase options, compatibility information, combinations thereof, or the like. In various embodiments, the user device 102 can provide this and other information, or obtain preferences, compatibility data, or the like, via one or more displays 138. The displays 138 will be illustrated and described in more detail below.

The shopping application 108, or the shopping service 110, also can be configured to monitor one or more communications 140 sent by, received at, and/or associated with the user device 102 to identify an item reference. The communications 140 can be sent by or to a communication source 142. The communication source 142 can include a short message service center ("SMSC"), a mail server, a multimedia message service center ("MMSC"), a cellular phone or other communication device, a telephone, combinations thereof, or the like. The item reference can include any reference to a product, object, item, or service, which may be detected using natural language analysis, identification of identifiers, flags, or the like. In the illustrated embodiment of FIG. 1, the communication 140 is illustrated as being received by the user device 102. Thus, it can be appreciated that the communication 140 may correspond to an email or text that references a product, item, or service. The communication 140 also can correspond to an update to a shopping list, or the like. Because the communication 140 can be sent to or from other devices, it should be understood that these examples are illustrative and therefore should not be construed as being limiting in any way.

In practice, a shopping list can be created at or accessed by the user device 102. The user device 102 may be used as part of a shopping experience such as for scanning items, for conducting item-related searches, for conducting price checks, for navigating through stores or other facilities, combinations thereof, or the like. In various embodiments, the shopping application 108 can provide the functionality illustrated and described herein for creating a shopping list and/or shopping for items or services on the shopping list, navigating a user through the store to obtain items on the list, presenting promotions 128 and/or offers 126 for items on the list and/or alternatives to items on the list, checking compatibility of items on the list, combinations thereof, or the like.

The user device 102 can generate user data 114 that includes object data relating to one or more items, products, services, or the like; preferences; shopping list data; compatibility data; orientation data; other data (not illustrated);

combinations thereof; or the like. The other data can include, in some embodiments, data indicating one or more communications 140 and/or item references received at the user device 102. The user device 102 can transmit the user data 114 to the shopping service 110, in some embodiments. In some other embodiments, the user device 102 can store and/or use the user data 114 at the user device 102 to provide the functionality illustrated and described herein. The shopping service 110 can obtain the user data 114 and the collected data 120 from one or more data sources 122.

The shopping service 110 can analyze the user data 114 and the collected data 120 to create shopping data 116. The shopping data 116 can include or represent the user data 114, history information, the collected data 120, other data, and the like, and can be used to generate one or more purchase alternatives, to identify promotions, to determine purchase histories and/or trends, and/or for other purposes. The shopping service 110 can generate display data 136 and provide the display data 136 to the user device 102 for presentation at the user device 102. In some other embodiments, the user device 102 can obtain the collected data 120 from the shopping service 110 and generate the display data 136 at the user device 102. Regardless of where the display data 136 is generated, the user device 102 can present one or more displays 138 at the user device 102. The displays 138 can be used during shopping to provide various functions and/or enhancements for a user or other entity.

According to various embodiments of the concepts and technologies described herein, the displays 138 can be used to guide users through a store or other environment to find a product, object, item, service, or the like on a shopping list. The displays 138 also can present one or more promotions relating to one or more items on a shopping list. The promotions also can relate to items not on a shopping list, for example where a store may push the promotions to the user device 102 when the user device 102 arrives at or near a store, where a history indicates that the item may be of interest to the user or other entity, and/or at other times. The displays 138 also can provide purchase options to a user during a shopping service. In some embodiments, as will be illustrated and described herein with reference to FIGS. 6A-6G, the purchase options can be provided by way of a virtual shelf or the like presented within an augmented reality shopping display or other embodiment of the display 138. It should be understood that this example is illustrative and therefore should not be construed as being limiting in any way.

The displays 138 also can indicate that an item reference or product reference has been detected at the user device 102 or elsewhere. The displays 138 also can present compatibility information. Thus, for example, if a user who is generally gluten-free scans an item that contains gluten, the displays 138 can present a warning to the user or other entity. In some other embodiments, the compatibility information can relate to a vehicle, office, home, room, or other entity or location and can indicate if the user can transport the item, if the item will fit in a room or building, combinations thereof, or the like. Thus, embodiments of the concepts and technologies described herein can be used to simplify a shopping experience for a user or other entity.

FIG. 1 illustrates one user device 102, one network 104, one server computer 112, one data store 118, three data sources 122, and one communication source 142. It should be understood, however, that various implementations of the operating environment 100 can include zero, one, or more than one user device 102; zero, one, or more than one network 104; zero, one, or more than one server computer 112; zero, one, or more than one data store 118; zero, one, two, three, or more than three data sources 122; and zero, one, or more than one communication source 142. As such, the illustrated embodiment should be understood as being illustrative, and should not be construed as being limiting in any way.

Figure 2:
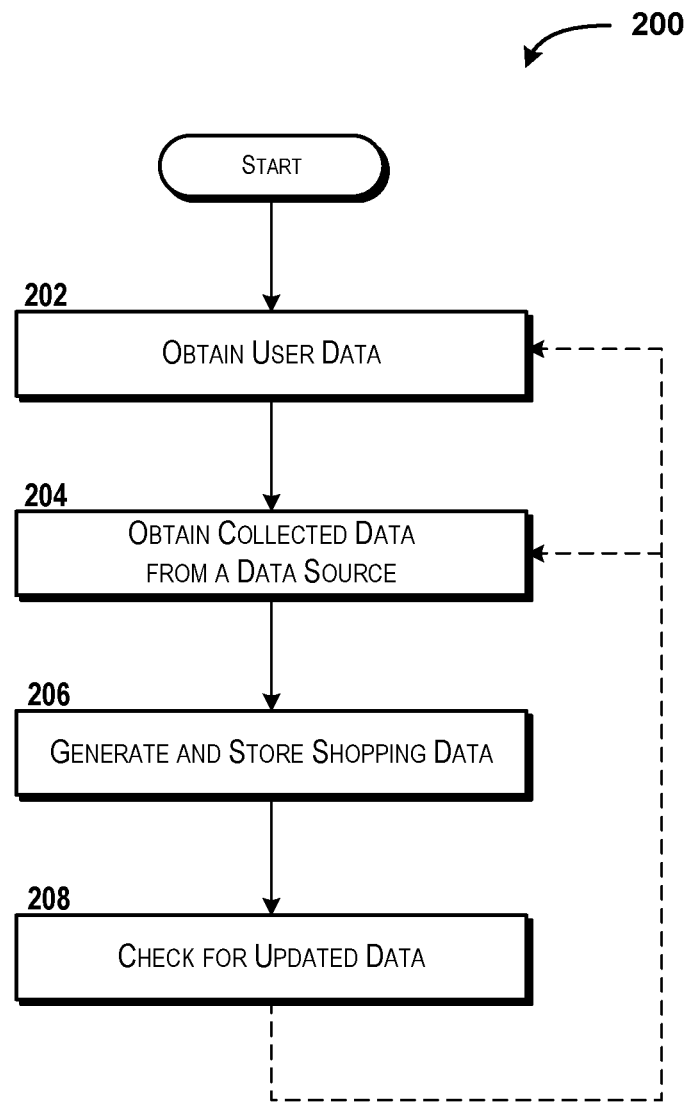
FIG. 2 is a flow diagram showing aspects of a method for generating and updating shopping data, according to an illustrative embodiment of the concepts and technologies described herein.

Turning now to FIG. 2, aspects of a method 200 for generating and updating shopping data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 112, to perform one or more operations and/or causing the processor to direct other components of the computing system or device to perform one or more of the operations.

For purposes of illustrating and describing the concepts of the present disclosure, the methods disclosed herein are described as being performed by the user device 102 via execution of one or more software modules such as, for example, the shopping application 108, or the server computer 112 via execution of one or more software modules such as, for example, the shopping service 110. It should be understood that additional and/or alternative devices and/or network nodes can provide the functionality described herein via execution of one or more modules, applications, and/or other software including, but not limited to, the shopping application 108 and/or the shopping service 110.

Thus, the illustrated embodiments are illustrative, and should not be viewed as being limiting in any way.

The method 200 begins at operation 202. At operation 202, the server computer 112 can obtain user data 114. As illustrated and described above with reference to FIG. 1, the user data 114 can include, but is not limited to, object data, preferences, shopping list data, compatibility data, orientation data, other data, combinations thereof, or the like. Thus, the user data 114 can include and/or can represent one or more shopping lists; one or more items, objects, products, and/or services being interacted with by or in proximity to the user device 102; one or more preferences, settings, options, or configurations associated with the shopping application 108 and/or the shopping service 110; compatibility data associated with a structure, a room, a vehicle, a user or other entity, or the like; orientation data that can define an orientation and/or location of the user device 102; other information such as communication-related information; combinations thereof; or the like.

According to various embodiments, the server computer 112 can obtain the user data 114 from the user device 102 in response to a request for the user data 114. In some other embodiments, the server computer 112 can obtain the user data 114 without requesting the user data 114. For example, the user device 102 can be configured to provide the user data 114 to the server computer 112 during a setup process, upon detecting creation of the user data 114 or a component thereof, according to a schedule, and/or at other times. Because the user data 114 can be obtained by the server computer 112 at additional and/or alternative times, it should be understood that these examples are illustrative and therefore should not be construed as being limiting in any way.

From operation 202, the method 200 proceeds to operation 204. At operation 204, the server computer 112 can obtain collected data 120 from a data source 122. In some embodiments, the server computer 112 can identify one or more data sources 122 based upon the user data 114. Thus, for example, if the server computer 112 detects a particular item on a shopping list, the server computer 112 can obtain an offer 126 from an offer source 132 such as a vendor that sells the item. It should be understood that this example is illustrative and therefore should not be construed as being limiting in any way.

In operation 204, the server computer 112 can obtain location data 124, one or more offers 126, and/or one or more promotions 128 from the data sources 122. While FIG. 1 illustrates a communication 140 being sent to or from the user device 102, it should be understood that in some embodiments the communication 140 may pass through a network or other devices that may be in communication with the server computer 112. Thus, the data sources 122 can include a communication source 142, in some embodiments, and as such the collected data 120 can include one or more communications 140 in some cases.

From operation 204, the method 200 proceeds to operation 206. At operation 206, the server computer 112 can store the shopping data 116. As illustrated and described above with reference to FIG. 1, the server computer 112 can generate the shopping data 116 based upon the user data 114 and/or the collected data 120. Thus, the shopping data 116 can include the user data 114, the collected data 120, history information that can reflect trends and/or histories associated with the user device 102 and/or a user thereof, and/or other data. The shopping data 116 can be stored at a data store 118 or elsewhere.

From operation 206, the method 200 proceeds to operation 208. At operation 208, the server computer 112 can check for updated data from the user device 102, the one or more data sources 122, the communication source 142, or the like. Thus, the server computer 112 can determine if the user data 114 has been updated, if the collected data 120 has been updated, and/or if a communication 140 has been received or sent. It should be understood that this example is illustrative and therefore should not be construed as being limiting in any way.

The server computer 112 can repeat one or more of the operations 202-208 repeatedly, if desired. Thus, from operation 208, the method 200 can pause until a data update is detected, after which the method 200 can return to operation 202 (if an update to the user data 114 is detected) or operation 204 (if an update to the collected data 120 is detected). In some other embodiments, the method 200 can end at operation 206. As such, the illustrated embodiment should not be construed as being limiting in any way.

Figure 3:
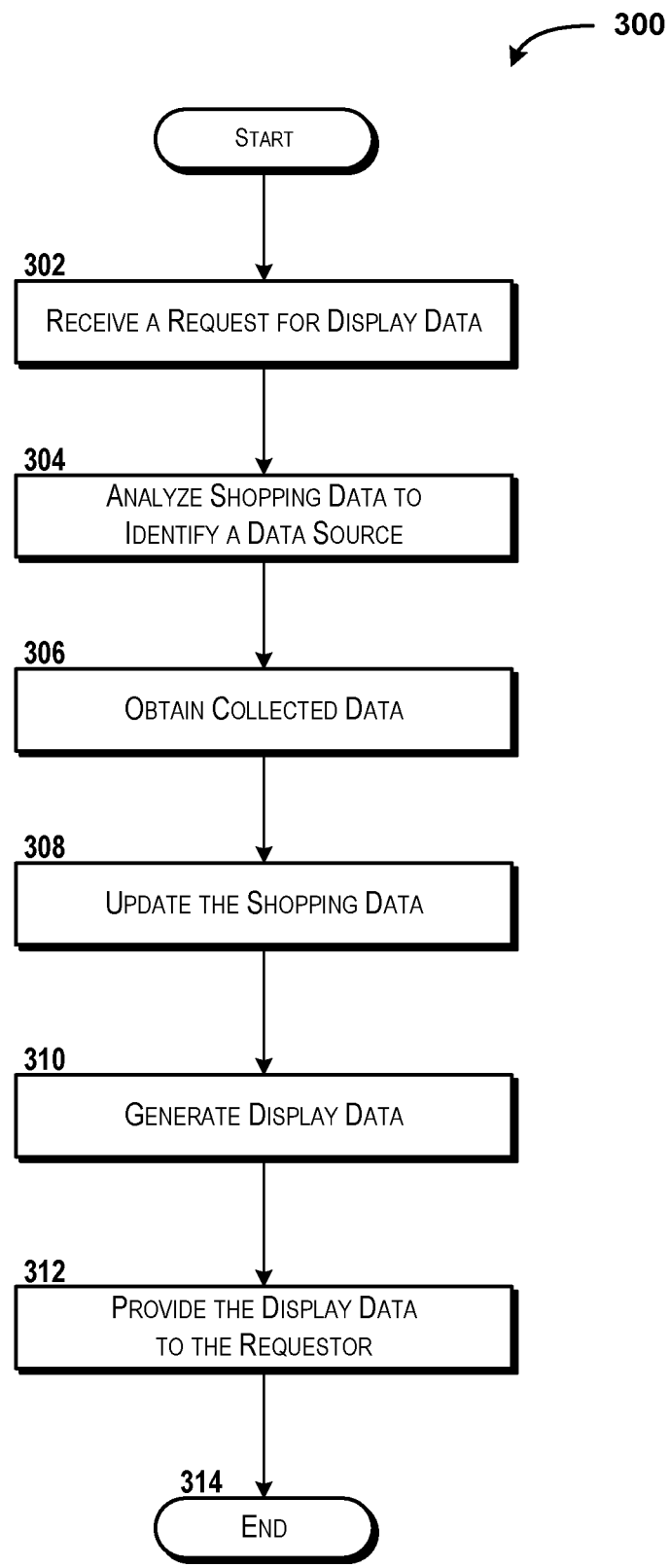
FIG. 3 is a flow diagram showing aspects of a method for generating display data for providing augmented reality shopping displays, according to an illustrative embodiment of the concepts and technologies described herein.

Turning now to FIG. 3, aspects of a method 300 for generating display data 136 for providing augmented reality shopping displays will be described in detail, according to an illustrative embodiment. The method 300 begins at operation 302. At operation 302, the server computer 112 can receive a request for display data 136. In some embodiments, the request received in operation 302 can be an explicit request. For example, the user device 102 can generate an explicit request for the display data 136 from the shopping service 110, which can be a callable service hosted by the server computer 112. In some other embodiments, the request may be implicitly generated, for example, by the user device 102 submitting the user data 114, which the server computer 112 may understand as a request for the display data 136.

In some embodiments, the shopping application 108 can be configured to obtain the display data 136 when the shopping application 108 is initiated, and as such, the request received in operation 302 can correspond to the shopping application 108 initiating contact between the user device 102 and the shopping service 110 and/or the server computer 112. Because the request illustrated in operation 302 can be explicit or implicit, and because the request for display data 136 can be generated in a number of manners, it should be understood that these examples are illustrative and therefore should not be construed as being limiting in any way.

From operation 302, the method 300 proceeds to operation 304. At operation 304, the server computer 112 can analyze the shopping data 116 to identify a data source 122. It should be understood that the data source 122 identified in operation 304 can include one or more data sources 122. In operation 304, the server computer 112 can analyze the request obtained in operation 302, or user data 114 received with the request, or by a requestor. The server computer 112 can determine, based upon the requestor, a requesting device, and/or an interaction occurring at the requestor or requesting device, a location, user, device, object, and/or history associated with the request. Thus, for example, if a user device 102 requests the display data 136 in operation 302, the server computer 112 can, in operation 304, identify user data 114 associated with the user device 102 and shopping data 116 that relates an object or other aspect related to the user data 114. It should be understood that this example is illustrative and therefore should not be construed as being limiting in any way.

In operation 304, the server computer 112 can identify one or more data sources 122 that may relate to the requestor or requesting device, for example via identifying an object associated with the requestor or requesting device and identifying one or more vendors that may be a source of offers 126 or promotions 128 relating to the object. Thus, for example, if a shopping list associated with a user device 102 includes an item, the server computer 112 can determine, in operation 304, one or more offer sources 132 who sell the item, one or more promotion sources 134 who offer coupons or other promotions for the item, or the like. The server computer 112 also can identify one or more location services 130 that may be able to provide location information relating to the requestor or the requesting device. Still further, the server computer 112 may identify one or more communication sources 142 that may communicate with the user device 102. Because the server computer 112 can identify data sources 122 in additional and/or alternative manners, it should be understood that these examples are illustrative and therefore should not be construed as being limiting in any way.

From operation 304, the method 300 proceeds to operation 306. At operation 306, the server computer 112 can obtain collected data 120. In some embodiments, the server computer 112 can obtain the collected data 120 from the data sources 122 identified in operation 304. Thus, the server computer 112 can obtain, in operation 306, one or more of location data 124, offers 126, promotions 128, and/or communications 140. In various embodiments of the concepts and technologies described herein, the request for display data 136 can relate to a particular display 138 and as such, the server computer 112 may obtain one type of collected data 120 from one type of data source 122. In some other embodiments, the request for display data 136 can result in the server computer 112 obtaining the collected data 120 from various types of data sources 122. Regardless of what data is requested and/or provided in the method 300, the server computer 112 can identify the data sources 122 and obtain the collected data 120 from those data sources 122 in operation 306.

From operation 306, the method 300 proceeds to operation 308. At operation 308, the server computer 112 can update the shopping data 116. In operation 308, the server computer 112 can update, for example, the history information and/or collected data 120 components of the shopping data 116, as well as other data included in the shopping data 116. Thus, for example, if the history information included in the shopping data 116 indicated previously that a purchase of a particular product occurred a week ago and the user data 114 indicates a current purchase being completed, the server computer 112 can update the shopping data 116 to indicate the current purchase. Additionally, or alternatively, the server computer 112 may update the collected data 120 portion of the shopping data 116 to reflect the collected data 120 obtained in operation 306. Because the shopping data 116 may not be updated in all embodiments, it should be understood that these examples are illustrative and therefore should not be construed as being limiting in any way.

From operation 308, the method 300 proceeds to operation 310. At operation 310, the server computer 112 can generate the display data 136. In operation 310, the server computer 112 can generate display data 136 that is relevant to the request received in operation 302 and/or the collected data obtained in operation 306. This will be more clearly understood with reference to the user interface diagrams illustrated in FIGS. 6A-6G below.

Briefly, if the request relates to display data 136 relating to generating a virtual shelf or the like, the display data 136 generated in operation 310 can include data for creating or presenting user interface elements such as the offers 126, virtual shelves, items for the virtual shelves, and user interface controls relating to the items and/or virtual shelves. Similarly, if the request relates to display data 136 relating to promotions 128, the display data 136 generated in operation 310 can include information relating to the promotions 128. Still further, if the request relates to display data 136 for information relating to a communication 140, the display data 136 can include display elements for presenting information relating to the communication 140 and/or the item reference, for example. Because the display data 136 can relate to one or more of these or other functionality as illustrated and described herein, it should be understood that these examples are illustrative and therefore should not be construed as being limiting in any way.

From operation 310, the method 300 proceeds to operation 312. At operation 312, the server computer 112 can provide the display data 136 generated in operation 310 to the requestor from whom the request was received in operation 302. Thus, in operation 310 the server computer 112 can provide the display data 136 to the user device 102 or to other devices or entities. It should be understood that the server computer 112 can provide the display data 136 to the requestor by transmitting the display data 136 to the requestor, by making the display data 136 available for download, and/or by otherwise making the display data 136 available. Thus, it can be appreciated that by executing the method 300, or some operations thereof, the server computer 112 can receive a request for the display data 136 and make the display data 136 available to a requestor. Although not necessarily part of the method 300, the user device 102 or other requestor can use the display data 136 to generate and/or present the display 138 and/or updates to the display 138. It should be understood that this example is illustrative and therefore should not be construed as being limiting in any way.

From operation 312, the method 300 proceeds to operation 314. The method 300 ends at operation 314.

Figure 4:
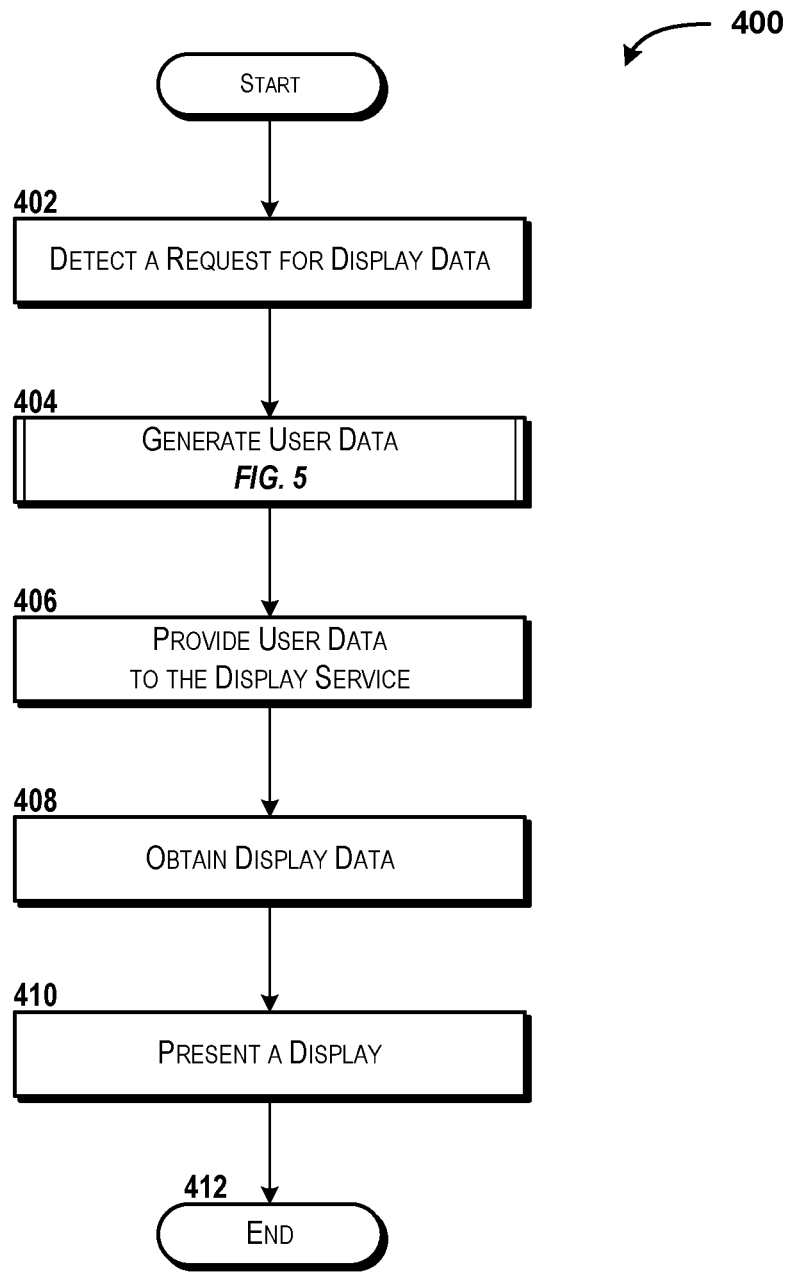
FIG. 4 is a flow diagram showing aspects of a method for providing augmented reality shopping displays, according to an illustrative embodiment of the concepts and technologies described herein.

Turning now to FIG. 4, aspects of a method 400 for providing augmented reality shopping displays will be described in detail, according to an illustrative embodiment. The method 400 begins at operation 402. At operation 402, the user device 102 can detect a request for display data 136. Because the request can be generated at the user device 102, it can be appreciated that the request detected in operation 402 can correspond to detecting initiation of the shopping application 108, detecting a request to present a display 138 such as the augmented reality shopping display illustrated and described herein, detecting an interaction with the shopping application 108, detecting an interacting with an object, item, product, or the like, combinations thereof, or the like.

Thus, it can be appreciated that the "request" detected in operation 402 can be an explicit request, an implicit request, and/or another action or activity that prompts the shopping application 108 and/or the user device 102 to obtain the display data 136. Because the display data 136 can be obtained at additional and/or alternative times, it should be understood that these examples are illustrative and therefore should not be construed as being limiting in any way.

From operation 402, the method 400 proceeds to operation 404. At operation 404, the user device 102 can generate user data 114. The user data 114 can be generated by the user device 102 as part of a request to obtain display data 136, in some embodiments. In some other embodiments, the user data 114 can be generated in response to detecting the request for the display data 136 as the user data 114 may be used in conjunction with the display data 136 to generate and/or display the display 138. Additional details of generating the user data 114 are illustrated and described herein with reference to FIG. 5.

Briefly, the user device 102 can generate or capture object data, preferences, shopping list data, compatibility data, orientation data, communications information, and/or other data. It can be appreciated that the user data 114 may be generated at the user device 102 using one or more screen displays such as the displays 138 to obtain user input, by capturing data at the user device 102, by capturing sensor readings at the user device 102, and/or via other interactions with or at the user device 102. These and other operations for obtaining and/or generating the user data 114 will be illustrated and described in more detail below with reference to FIG. 5.

From operation 404, the method 400 proceeds to operation 406. At operation 406, the user device 102 can provide the user data 114 to the server computer 112. In some embodiments, as mentioned above, the user data 114 may be used at the user device 102 and may not be provided to the server computer 112. As such, it can be appreciated that operation 406 can be omitted in some embodiments.

From operation 406, the method 400 proceeds to operation 408. At operation 408, the user device 102 can obtain the display data 136. In operation 408, the user device 102 can obtain the display data 136 from the server computer 112 or from another device, system, or the like. In some other embodiments, the user device 102 can generate the user data 114. Thus, operation 408 can correspond to receiving or generating the display data 136, according to various embodiments.

From operation 408, the method 400 proceeds to operation 410. At operation 410, the user device 102 can present the display 138. The display 138 presented in operation 410 can be presented to provide the user or other entity with one or more offers 126, one or more promotions 128, information relating to one or more communications 140, historical information and/or other collected data 120 such as location data, combinations thereof, or the like. The display 138 also can be used to create, maintain, and/or interact with a shopping list or the like. The displays 138 also can be used to obtain preferences, or the like. Some example embodiments of the display 138 are illustrated and described herein, particularly with reference to FIGS. 6A-6G. It should be understood that these examples are illustrative and therefore should not be construed as being limiting in any way.

From operation 410, the method 400 proceeds to operation 412. The method 400 ends at operation 412.

Figure 5:
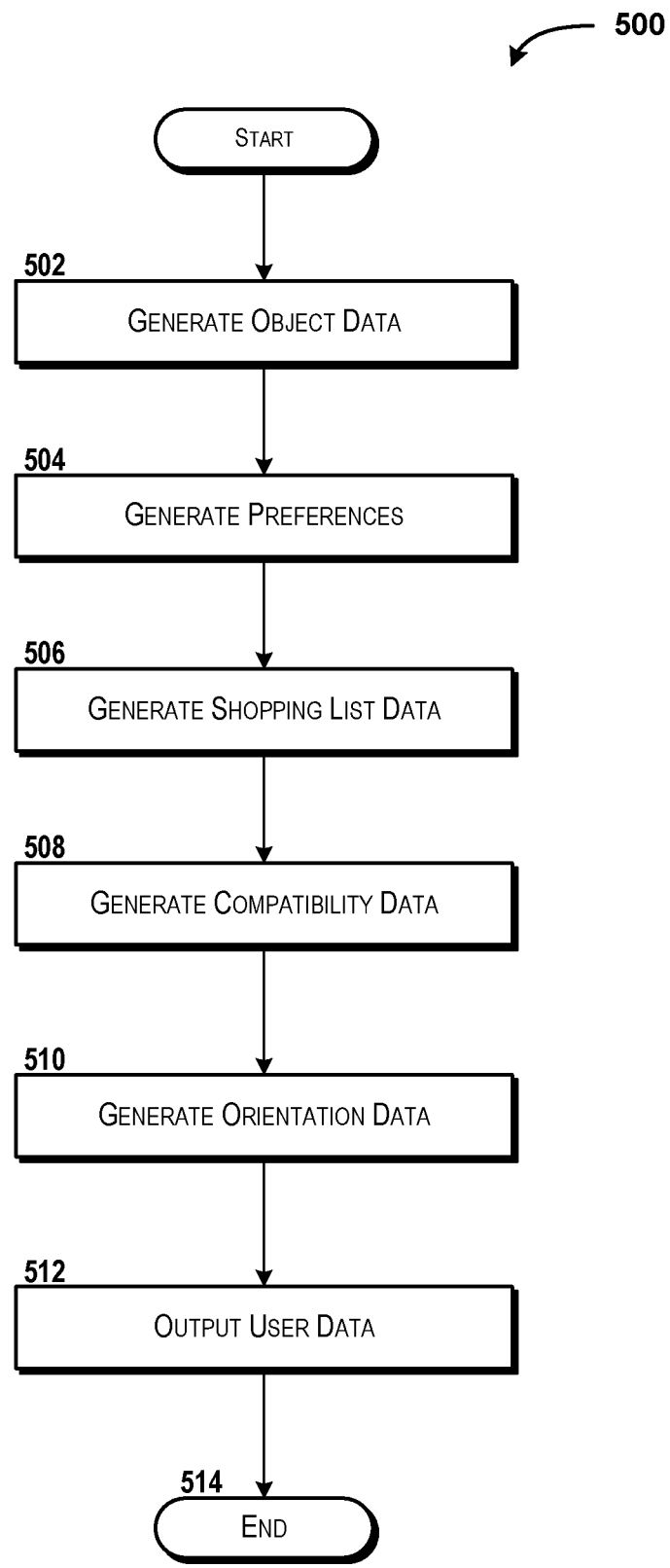
FIG. 5 is a flow diagram showing aspects of a method for generating user data for use in generating and/or presenting augmented reality shopping displays, according to an illustrative embodiment of the concepts and technologies described herein.

Turning now to FIG. 5, aspects of a method 500 for generating user data 114 for use in generating and/or presenting augmented reality shopping displays will be described in detail, according to an illustrative embodiment. It should be understood that the operations of the method 500 illustrated and described herein can be, but are not necessarily, provided by the user device 102 at operation 404 of the method 400 illustrated and described above with reference to FIG. 4. It should be understood that this example is illustrative and therefore should not be construed as being limiting in any way.

The method 500 begins at operation 502. At operation 502, the user device 102 can generate object data. It should be understood that the user device 102 can capture object data or generate the object data. The object data can relate to an object such as a product, an item, an object, a service, or the like that is being purchased, or considered for purchase, at the user device 102 and/or in association with the user device 102. The object data can be captured or generated, for example, by scanning a product barcode and identifying a product that is associated with the scanned barcode; by detecting an object on a shopping list; by detecting an item reference in a communication 140 and identifying the object based upon the item reference; by detecting a subject of a search conducted via the user device 102; by detecting one or more objects in a view of the user device 102 (e.g., in a camera view associated with the user device 102); by identifying an object associated with a promotion 128 received at the user device 102; combinations thereof; or the like. Thus, it can be appreciated that the object data can identify any purchased or purchasable item, product, object, service, or the like.

From operation 502, the method 500 proceeds to operation 504. At operation 504, the user device 102 can generate one or more preferences. In various embodiments, the user device 102 can obtain preferences, settings, options, or the like from a user or other entity at the user device 102 by presenting one or more screen displays at the user device 102 and obtaining input relating to the preferences. In some other embodiments, the preferences may be obtained from other sources such as, for example, program code, network systems, configuration files, combinations thereof, or the like. Because preferences may be stored at various times, it should be understood that the functionality of operation 504 may be omitted in some embodiments of the method 500 and/or may be performed at other times.

Regardless of where the preferences are obtained from and/or when the preferences are obtained, the preferences can reflect how and when the shopping application 108 and/or shopping service 110 are to be used, what types of displays 138 are to be generated and/or presented, what data and/or data sources 122 are to be accessed and/or considered in preparing display data 136, how history files are to be maintained and/or used, combinations thereof, or the like. Thus, the preferences can be used to define how the shopping application 108 and/or the shopping service 110 interact with the user, what information is included in the displays 138 and/or when the displays 138 are presented, how offers 126 and/or promotions 128 are obtained and/or presented, combinations thereof, or the like.

From operation 504, the method 500 proceeds to operation 506. At operation 506, the user device 102 can generate shopping list data. According to various embodiments, the user device 102 can provide functionality for generating, maintaining, updating, and/or storing shopping lists. Thus, the functionality illustrated by operation 506 can include obtaining a shopping list at the user device 102, obtaining a modification to the shopping list, obtaining a command to save the shopping list, combinations thereof, or the like. In some other embodiments, a shopping list can be stored at a server or other device, and the user device 102 can interact with the shopping list. As such, operation 506 can correspond to the user device 102 accessing a remote shopping list and capturing data corresponding to the shopping list. Because the shopping list data can be obtained in additional and/or alternative ways, it should be understood that these examples are illustrative and therefore should not be construed as being limiting in any way. Similarly, because the shopping list data may be created and/or modified at various times, it should be understood that the functionality of operation 506 may be omitted in some embodiments of the method 500 and/or may be performed at other times.

From operation 506, the method 500 proceeds to operation 508. At operation 508, the user device 102 can generate compatibility data. In operation 508, the user device 102 can obtain compatibility data relating to the user, the user device 102, a vehicle associated with the user or user device 102, a room or structure associated with the user or user device 102, and/or other locations or entities associated with the user or user device 102. Thus, according to various embodiments the compatibility data can define whether products, objects, items, and/or services are compatible with a user; a user's home, office, or other location; a user's body or health preferences; a user's vehicle or other transport mechanism; combinations thereof, or the like.

In some embodiments, for example, a user may define a vehicle or other mode of transport. The user device 102 can obtain the designation of the vehicle or other mode of transport and determine a capacity of the vehicle to carry goods, products, items, or other objects. Thus, if a user considers purchasing a particular item, the user device 102 can access the compatibility data to determine if the user's vehicle can carry the item (e.g., will the item fit, can the vehicle carry the weight, etc.).

In some other embodiments, a user may define a home living area, a door size, or the like, and when considering a purchase, the user device 102 can use the compatibility data to determine if the item can be brought through a door (or the like) into the home, if the item will fit in the room or space designated by the compatibility data, combinations thereof, or the like. In yet other embodiments, the compatibility data can indicate that a user is a vegetarian, that the user eats only kosher meat, that the user eats only halal, that the user eats only gluten free, combinations thereof, or the like. Thus, if a user considers purchasing a food product, the user device 102 can use the compatibility data to determine if the food product is compatible with the user's health and/or taste preferences. It should be understood that this example is illustrative and therefore should not be construed as being limiting in any way.

Thus, operation 508 can include obtaining compatibility data from a user or other entity. The compatibility data can be obtained in various manners and/or can be used for various manners as will be clear from the above description. In some embodiments, use of the compatibility data can prompt the user device 102 to verify that the compatibility data is still current. Furthermore, the compatibility data can be used to generate alerts or other display elements that may inform the user that a purchase may be incompatible. It should be understood that these examples are illustrative and therefore should not be construed as being limiting in any way. Furthermore, because the compatibility data may be created and/or modified at various times, it should be understood that the functionality of operation 508 may be omitted in some embodiments of the method 500 and/or may be performed at other times.

From operation 508, the method 500 proceeds to operation 510. At operation 510, the user device 102 can generate orientation data. The orientation data can be generated by obtaining location information (e.g., from a GPS receiver, or the like) as well as sensor readings from one or more sensors. The location information can indicate a geographic location associated with the user device 102, and the orientation data can indicate a direction in which the user device 102 is facing, an angle of incline associated with the user device 102, movements of the user device 102 (if any), combinations thereof, or the like. Thus, the orientation data can reflect where the user device 102 is as well as an orientation of the user device 102. This information can be used to generate the display 138, which can include augmented reality information and therefore may use a current location and orientation of the user device 102 to determine a point of view associated with the user device 102. It should be understood that this example is illustrative and therefore should not be construed as being limiting in any way.

From operation 510, the method 500 proceeds to operation 512. At operation 512, the server computer 112 can output the user data 114. The user data 114 can be packaged from the data generated in operations 502-510, in various embodiments, and this packaged data can be output in operation 512. When output in operation 512, the user data 114 can be used at the user device 102 and/or transmitted to other entities. Thus, it should be understood that the outputting of the user data 114 may include outputting the user data 114 to a location or device external to the user device 102, rather, that the user data 114 can be output to other applications, services, or the like executing at or in conjunction with the user device 102.

From operation 512, the method 500 proceeds to operation 514. The method 500 ends at operation 514. It should be understood that the method 500 can be performed with respect to execution of the operation 404 shown in FIG. 4. As such, execution of the method 400 can proceed after execution of the method 500, in some embodiments. It should be understood that this example is illustrative and therefore should not be construed as being limiting in any way.

Figure 6A:
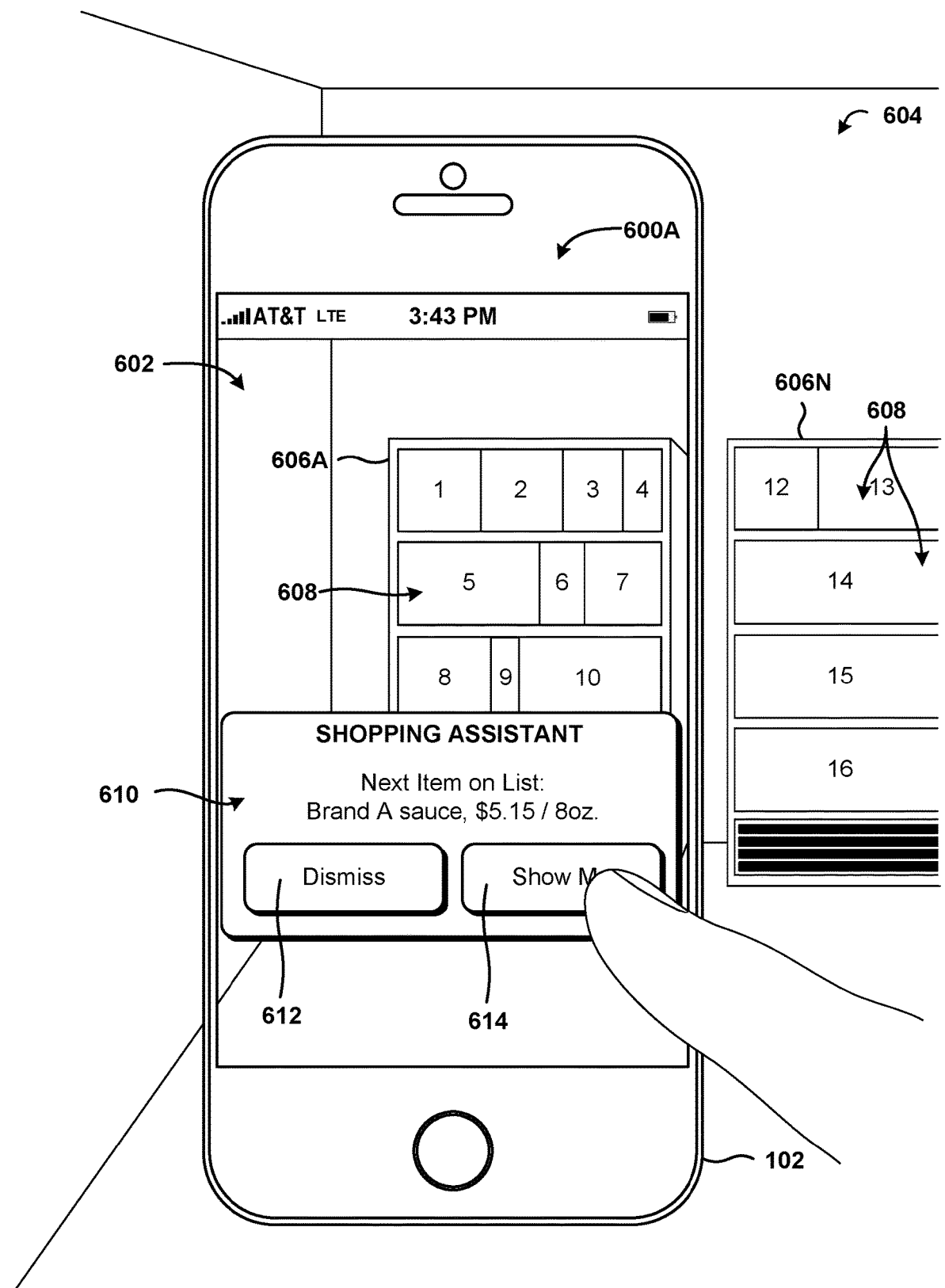
FIGS. 6A-6G are user interface diagrams showing various screen displays for providing augmented reality shopping displays, according to some illustrative embodiments of the concepts and technologies described herein.

FIGS. 6A-6G show aspects of UIs for interacting with, configuring, and/or providing functionality associated with a shopping application 108 and/or a shopping service 110, according to some illustrative embodiments of the concepts and technologies described herein. FIG. 6A shows an illustrative screen display 600A generated by a device such as the user device 102. According to various embodiments, the user device 102 can generate the screen display 600A and/or other screen displays in conjunction with execution of the shopping application 108 and/or interactions with the shopping service 110. It should be appreciated that the UI illustrated in FIG. 6A is illustrative of one contemplated example of the UIs and therefore should not be construed as being limited in any way. Additionally, it should be understood that the screen display 600A is one contemplated embodiment of the display 138.

The screen display 600A can include various menus and/or menu options (not shown in FIG. 6A). The screen display 600A also can include an augmented reality display 602. The augmented reality display 602 can be viewed and/or interacted with by a user or other entity to access and/or view the display data 136 as an overlay for an image of a real environment 604. In the illustrated embodiment, the real environment 604 is illustrated as a retail location. It should be understood that this example is illustrative and therefore should not be construed as being limiting in any way.

In the illustrated embodiment, the real environment 604 is shown as including two or more shelving units 606A-N (hereinafter collectively and/or generically referred to as "shelving units 606"). Products and/or other items ("items") 608 are illustrated as being located on or at the shelving units 606. The items 608 can include, for example, grocery items; office supplies; other products or items such as computers, computer components, clothing, food items, books, periodicals, drugs or health products, combinations thereof; or the like. It should be appreciated that the items 608 can include almost any type of items including indicia for bulky items, indicia for services, combinations thereof, or the like. Thus, the numbered items 608 shown in FIG. 6A should be understood as being merely illustrative of various items 608 that can be located at or near the shelving units 606 and/or other locations.

According to various embodiments, a user may wish to see display data 136 associated with a location such as, for example, the real environment 604. Various types of input may be entered at or using a user device and/or other devices. In response to the input, a display 138 can be generated, for example, at a user device 102 such as the user device 102 shown in FIGS. 1 and 6A, among others. The display 138 can include the augmented reality display 602 to present the display data 136 in a meaningful way at the user device 102.

As shown in FIG. 6A, the augmented reality display 602 can include a user shopping guide window 610. The user shopping guide window 610 can provide an indication, to a user or other entity, of a next item on a shopping list or other list. The user shopping guide window 610 can provide information that identifies the next item on a shopping list in general or particular terms. For example, the user shopping guide window 610 could identify a next item as sauce (generally), or specifically identify a brand, size, price, or the like, such as "Brand A Sauce in a twenty four ounce bottle" with an associated price, etc. In the illustrated embodiment, the user shopping guide window 610 provides an indication that the next item on the shopping list or other list is Brand A sauce along with other information such as size and price. It should be understood that this example is illustrative and therefore should not be construed as being limiting in any way. It also should be understood that pricing information can be drawn from history information, from store or retailer systems, from promotion information, combinations thereof, or the like.

The user shopping guide window 610 also can present a UI control 612 to dismiss the user shopping guide window 610 and a UI control 614 to guide the user to the next item on the shopping list or other list. In response to selection of the UI control 612, the user device 102 can update the display to hide the user shopping guide window 610. In response to selection of the UI control 614, the user device 102 can update the display to shown directions or an indication for locating the next item on the shopping list or other list. Because additional and/or alternative UI controls can be included in the user shopping guide window 610, it should be understood that these examples are illustrative and therefore should not be construed as being limiting in any way.

While the user shopping guide window 610 is illustrated as showing a particular brand of sauce and other information such as a size of the container and a price, it should be understood that this information (the brand) may or may not be included in the shopping list. In particular, a brand for a particular item may be determined based upon history information (e.g., what brand the user previously purchased, most recently purchased, or most frequently purchased), preferences, brands that are available at a current location, compatibility information (e.g., gluten-free, kosher, or the like), brands for which coupons are available, combinations thereof, or the like. As such, the illustrated embodiment should be understood as being illustrative and should not be construed as being limiting in any way.

Figure 6B:
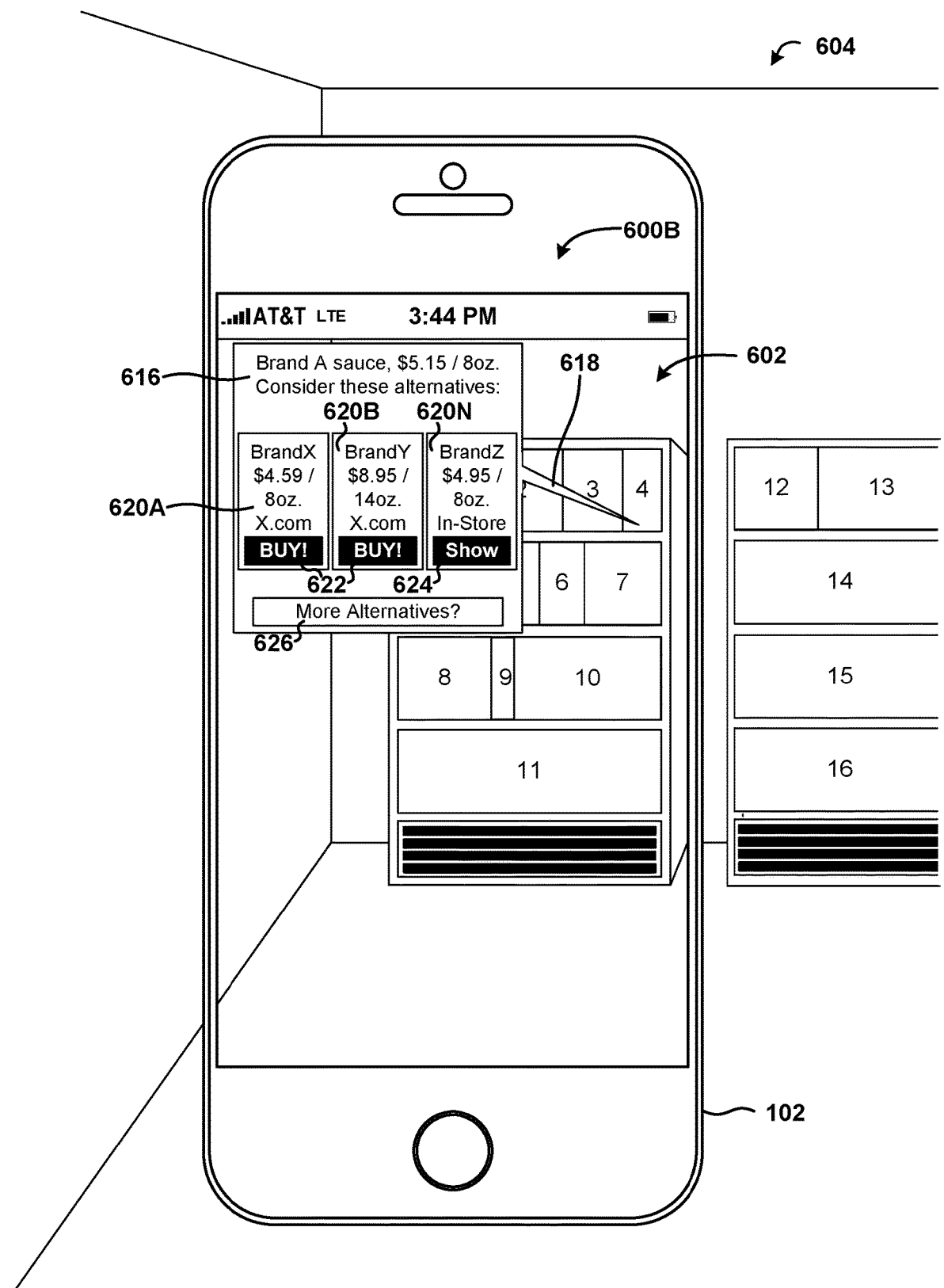

Referring now to FIG. 6B, additional aspects of the concepts and technologies disclosed herein for configuring and/or interacting with a shopping application 108 and/or a shopping service 110 are described in detail. In particular, FIG. 6B shows an illustrative screen display 600B generated by a device such as the user device 102. It should be appreciated that the UI diagram illustrated in FIG. 6B is illustrative of one contemplated example of a UI and therefore should not be construed as being limited in any way. As shown in FIG. 6B, the screen display 600B can be presented on a mobile computing device such as a smartphone, if desired. It should be understood that this example is illustrative, and should not be construed as being limiting in any way. Additionally, it should be understood that the screen display 600B is one contemplated embodiment of the display 138.

The screen display 600B can be displayed by the user device 102, for example, in response to selection of the UI control 614 illustrated and described above with regard to FIG. 6A or another command to guide the user or other entity to a next item on the shopping list. It can be appreciated with collective reference to FIGS. 6A-6B that the real environment 604 shown in FIG. 6B can be the same as the real environment 604 shown in FIG. 6A, though a different screen display 600B may be presented on the user device 102. It can be appreciated from the description above that this embodiment is illustrative and therefore should not be construed as being limiting in any way.

In the screen display 600B shown in FIG. 6B, another augmented reality display 602 is illustrated with an alternative embodiment of the user shopping guide window 610 illustrated and described above with reference to FIG. 6A. In the embodiment shown in FIG. 6B, the user shopping guide window 610 has been hidden from view and instead a virtual shelf 616 is shown in the augmented reality display 602. It should be understood that this example is illustrative and therefore should not be construed as being limiting in any way.

The virtual shelf 616 can include an indication of the next item on the shopping list and can include a pointer 618. The pointer 618 can point to a location depicted in the augmented reality display 602 that corresponds to the location of the next item on the shopping list, though the pointer 618 can be omitted according to various embodiments. The virtual shelf 616 also can include one or more alternative product choices or purchase options ("product alternatives") 620A-N (hereinafter collectively and/or generically referred to as "product alternatives 620"). It should be understood that this example is illustrative and therefore should not be construed as being limiting in any way.

As shown in FIG. 6B, the product alternatives 620 can include indications of products that are similar to the next item on the shopping list. In some embodiments, the product alternatives 620 may be obtained from the shopping service 110. As such, it can be appreciated that the shopping service 110 may use the shopping data 116 to identify alternatives previously purchased by the user, or otherwise indicated as being alternatives for the user. In some other embodiments, the shopping service 110 may access one or more promotions 128 such as sale information, coupons, or the like, to identify similar products that may be on sale, that may have available a coupon or other promotion, or the like. Regardless of how the alternatives are identified, the product alternatives 620 can be generated and presented on a virtual shelf 616 to enable the user to consider the purchase options before buying the next item on the list.

With reference to FIG. 6B, it can be appreciated that the product alternatives 620A, 620B can be purchased online, while the product alternative 620N may be purchased in-store. Thus, the virtual shelf 616 also can include UI controls 622 to buy the product indicated by the respective product alternatives 620 online and/or a UI control 624 to guide the user to the product indicated by the product alternative 620N. It should be appreciated that selection of the UI control 624 can prompt the user device 102 to update the display in a manner similar to that illustrated and described herein with regard to selection of the UI control 614. It should be understood that this example is illustrative and therefore should not be construed as being limiting in any way.

The virtual shelf 616 also can include a UI control 626. The UI control 626 can be used to prompt the user device 102 to obtain additional product alternatives 620. It can be appreciated that selection of the UI control 626 can prompt the user device 102 to display additional product alternatives 620 and/or to access the shopping service 110 to obtain data to generate and/or display additional product alternatives 620. Because additional product alternatives 620 can be obtained and/or displayed in additional and/or alternative manners, it should be understood that this example is illustrative and therefore should not be construed as being limiting in any way.

Figure 6C:
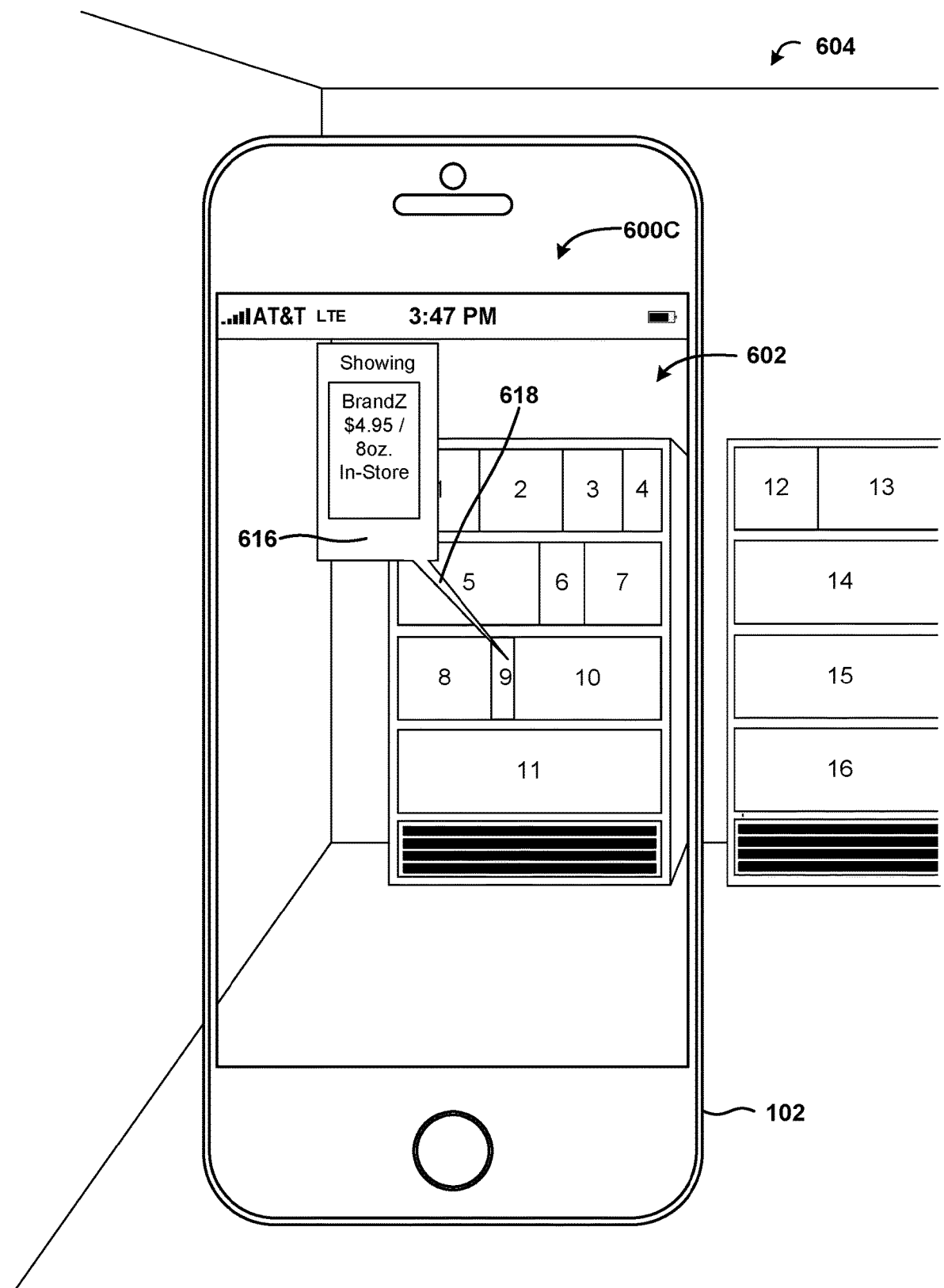

Turning now to FIG. 6C, additional aspects of the concepts and technologies disclosed herein for interacting with and/or providing functionality associated with a shopping application 108 and/or a shopping service 110 are described in detail. In particular, FIG. 6C shows a screen display 600C that may be generated by and/or presented using a device such as the user device 102 via execution and/or interaction with a shopping application 108 and/or via interactions with a shopping service 110. For purposes of illustrating and describing the concepts and technologies described herein, the screen display 600C is illustrated as if a user or other entity selected the UI control 624 shown in FIG. 6B. Because the screen display 600C can be shown at additional and/or alternative times and/or in response to other triggers or commands, it should be understood that this example is illustrative and therefore should not be construed as being limiting in any way. Additionally, it should be understood that the screen display 600C is one contemplated embodiment of the display 138.

In the screen display 600C shown in FIG. 6C, the augmented reality display 602 has been updated to modify the virtual shelf 616. In particular, the virtual shelf 616 has been modified to show only the product alternative 620N shown in FIG. 6B in response to a user or other entity selecting the UI control 624. Additionally, as can be seen in FIG. 6C, the pointer 618 associated with the virtual shelf 616 has been modified to point to a location depicted in the augmented reality display 602 that corresponds to the location of the item associated with the product alternative 620N. Because the pointer 618 can be substituted with other graphic elements such as arrows, crosshairs, dots, or can be omitted entirely, it should be understood that this example is illustrative and therefore should not be construed as being limiting in any way.

In generating the screen display 600C, it can be appreciated that the user device 102 and/or the server computer 112 can exchange data and/or access various data sources to generate the display data 136. In some embodiments, for example, the user device 102 can obtain information from the shopping service 110 and use the data obtained from the shopping service 110 to generate the display data 136. In some other embodiments, the shopping service 110 can generate the display data 136 and provide the display data 136 to the user device 102.

Figure 6D:
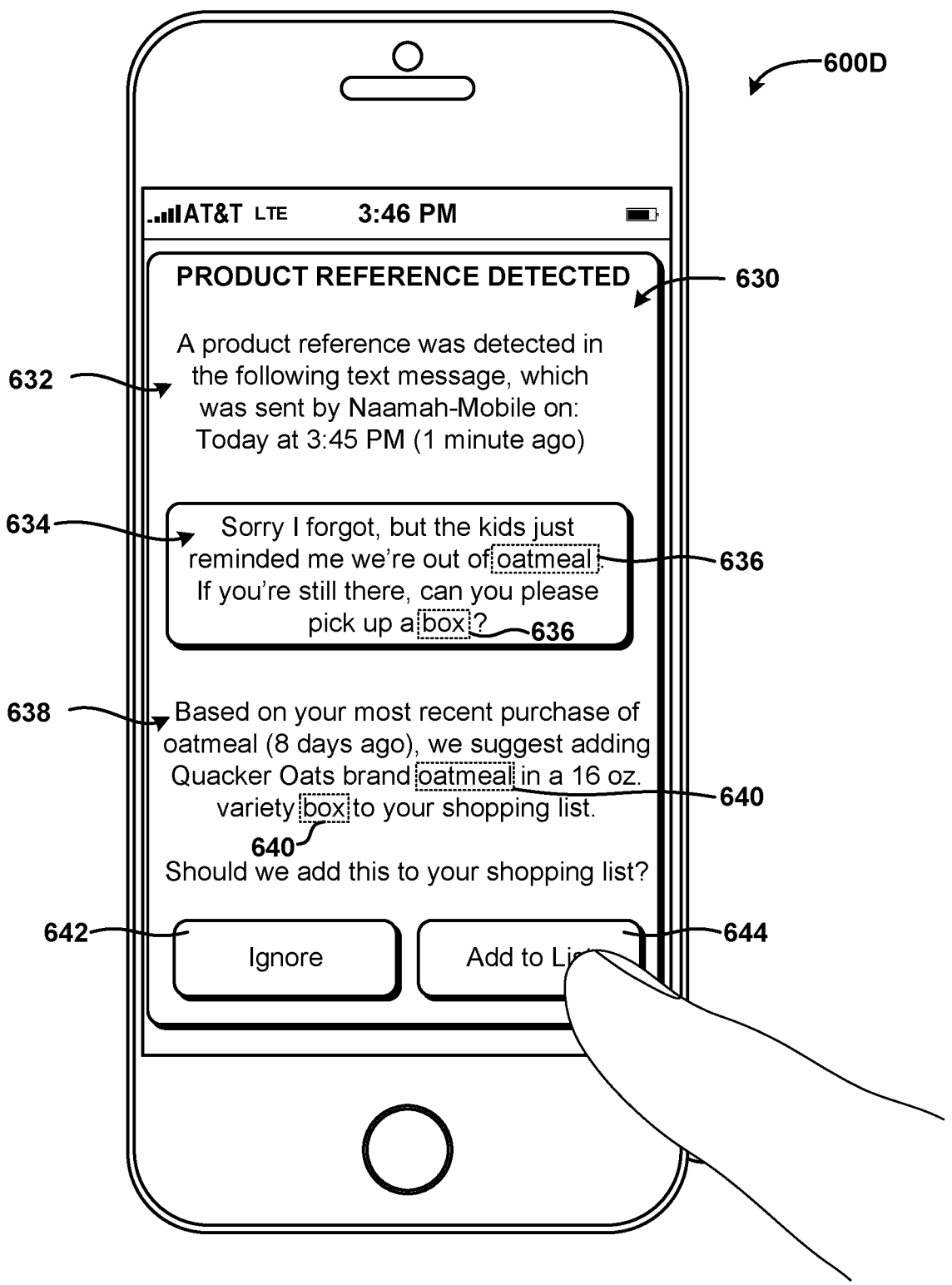

Referring now to FIG. 6D, additional aspects of the concepts and technologies disclosed herein for configuring and/or interacting with a shopping application 108 and/or a shopping service 110 are described in detail. In particular, FIG. 6D shows an illustrative screen display 600D generated by a device such as the user device 102. It should be appreciated that the UI diagram illustrated in FIG. 6D is illustrative of one contemplated example of a UI and therefore should not be construed as being limiting in any way. As shown in FIG. 6D, the screen display 600D can be presented on a mobile computing device such as a smartphone, if desired. It should be understood that this example is illustrative, and should not be construed as being limiting in any way. Additionally, it should be understood that the screen display 600D is one contemplated embodiment of the display 138.

The screen display 600D can include a product or item reference window ("product reference window") 630. The product reference window 630 can be displayed by the user device 102, for example, in response to the shopping application 108 executing at the user device 102 detecting a product reference in an incoming communication such as the communication 140. The incoming communication can correspond, for example, to an email, a text message, an SMS message, a social networking update, an update detected with respect to a shared shopping list, combinations thereof, or the like. For purposes of illustrating and describing the concepts and technologies described herein, the product reference window 630 is illustrated and described as indicating that a text message that includes a product reference has been received. Because the product reference can be detected in other manners and/or other types of communications 140, it should be understood that this example is illustrative and therefore should not be construed as being limiting in any way.

As shown in FIG. 6D, the product reference window 630 can indicate to a user or other entity that a produce reference has been detected in some action, activity, communication, or the like occurring at or in association with the user device 102. In the illustrated embodiment, the product reference window 630 can include an indication 632 that data or activity including a product reference has been detected in an incoming communication such as the communication 140. It should be understood that this example is illustrative and therefore should not be construed as being limiting in any way.

In the illustrated embodiment, the indication 632 displayed in the product reference window 630 can indicate a type of communication or activity with which the product reference has been detected, as well as a time, date, and/or other information that can be used to provide a user or other entity with information relating to the activity or action that prompted the user device 102 to display the product reference window 630. In the illustrated embodiment, the indication 632 indicates that a text message received by the user device 102 included words that prompted the shopping application 108 to generate the product reference window 630. It should be understood that this example is illustrative and therefore should not be construed as being limiting in any way.

In the illustrated embodiment, the product reference window 630 displays a reproduced version 634 of the communication such as the communication 140, though this is not necessarily the case. As shown in FIG. 6D, the concepts and technologies described herein can include displaying one or more markers 636. The markers 636 can indicate the language, number, image, or reference within the reproduced version 634 of the communication (or other activity) that has been interpreted by the user device 102 as a product reference or item reference. In FIG. 6D, the markers 636 mark words that have been interpreted by the user device 102 as product or item references. It should be understood that this example is illustrative and therefore should not be construed as being limiting in any way.

The product reference window 630 also can include a suggestion 638 that can be based upon the detected product reference. In FIG. 6D, the suggestion 638 can include a suggestion to add the product or item associated with the product or item reference to a shopping list. It should be understood that this example is illustrative. Other suggestions 638 can include, for example, ordering an item online, checking a price of an item, looking for coupons or alternatives to the item, combinations thereof, or the like. In the illustrated embodiment, the suggestion 638 can include product and packaging identifiers ("identifiers") 640. The identifiers 640 can be visually tied to the markers 636 to illustrate to a user or other entity how the suggestion 638 is based upon the communication or activity that prompted creation and/or display of the product reference window 630. It should be understood that this example is illustrative and therefore should not be construed as being limiting in any way.

The screen display 600D can include a UI control 642. Selection of the UI control 642 can cause the user device 102 to ignore the detected product or item reference and/or the suggested action proposed in response to detecting the product or item reference. Thus, it can be appreciated that selection of the UI control 642 can cause the user device 102 to hide the product reference window 630 and/or ignore the product reference. The screen display 600D also can include a UI control 644. Selection of the UI control 644 can cause the user device 102 to add the product illustrated in the suggestion 638 to a shopping list, or the like. Because other actions can be suggested as noted above, it should be understood that the UI control 644 can be substituted for UI controls that prompt other actions by the user device 102. As such, the illustrated embodiment should not be construed as being limiting in any way.

Figure 6E:
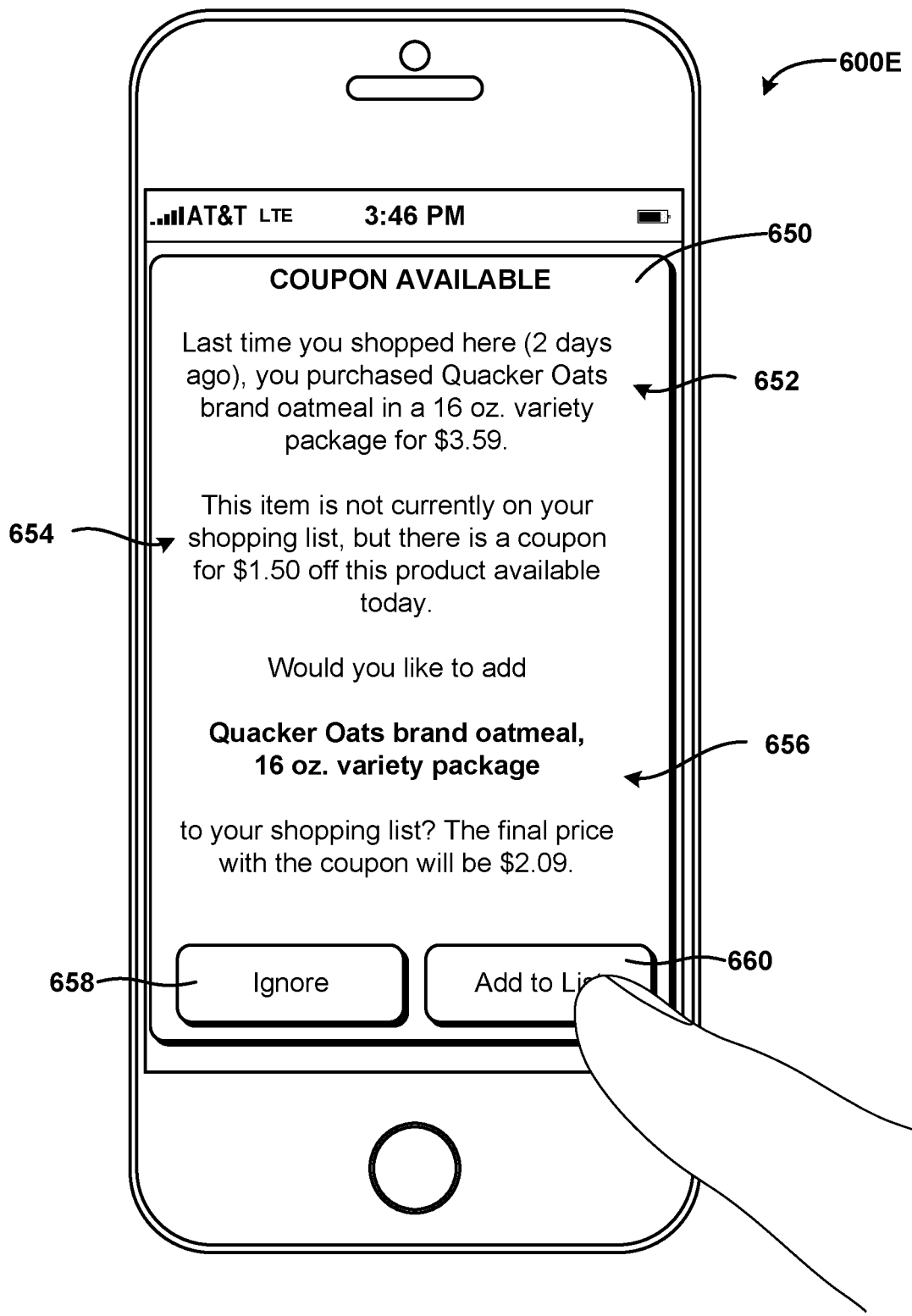

Referring now to FIG. 6E, additional aspects of the concepts and technologies disclosed herein for configuring and/or interacting with a shopping application 108 and/or a shopping service 110 are described in detail. In particular, FIG. 6E shows an illustrative screen display 600E generated by a device such as the user device 102. It should be appreciated that the UI diagram illustrated in FIG. 6E is illustrative of one contemplated example of a UI and therefore should not be construed as being limited in any way. As shown in FIG. 6E, the screen display 600E can be presented on a mobile computing device such as a smartphone, if desired. It should be understood that this example is illustrative, and should not be construed as being limiting in any way. Additionally, it should be understood that the screen display 600E is one contemplated embodiment of the display 138.

The screen display 600E can include a coupon or other promotion available window ("coupon available window") 650. The coupon available window 650 can be displayed by the user device 102, for example, in response to the shopping application 108 executing at the user device 102 detecting that a coupon or other promotion is available for a product on a shopping list, for a product associated with a purchase history of a user (at the location or elsewhere), or the like. The coupon available window 650 also can be generated in response to a communication 140 sent to the user device 102, where the communication 140 can indicate that the coupon or other promotion is available. Because the coupon available window 650 can be presented in response to other triggers and/or at other times, it should be understood that this example is illustrative and therefore should not be construed as being limiting in any way.

As shown in FIG. 6E, the coupon available window 650 can indicate to a user or other entity that a coupon or other promotion is available for a particular product. Although not included in all embodiments, the coupon available window 650 can include history information 652. The history information can be associated with the user, the user device 102, and/or the current location. Thus, as shown in FIG. 6E, the history information 652 can include an indication that a user previously purchased a particular item at the location. It should be understood that this example is illustrative and therefore should not be construed as being limiting in any way.

The coupon available window 650 also can include coupon information 654 that can indicate a promotion or the like associated with the coupon or other promotion that is available. Thus, the coupon information 654 can indicate an amount off of a purchase price, a percentage off a purchase price, and/or other details associated with the promotion such as, for example, buy one get one free offers, or the like.

The coupon available window 650 also can include a suggestion 656. The suggestion 656 can include a suggestion to add the product associated with the product reference to a shopping list, or the like, as explained above in detail with reference to FIG. 6D. As noted above, the suggestion 656 also can include, for example, a suggestion to order an item online, a suggestion to check a price of the item, a suggestion to purchase a similar or equivalent item, a suggestion to search for coupons for the item, a suggestion to consider alternatives to the item, combinations thereof, or the like. Because other suggestions 656 are possible and are contemplated, it should be understood that these examples are illustrative and therefore should not be construed as being limiting in any way.

The screen display 600E can include a UI control 658. Selection of the UI control 658 can cause the user device 102 to ignore the coupon or other promotion and/or to take no action with respect to the coupon or other promotion. Thus, it can be appreciated that selection of the UI control 658 can cause the user device 102 to hide the coupon available window 650 and/or to ignore the coupon or other promotion. In some embodiments, the user device 102 can take one or more actions to save the coupon or other promotion for later use, or the like, instead of ignoring the coupon or other promotion. The screen display 600E also can include a UI control 660. Selection of the UI control 660 can cause the user device 102 to add the product illustrated in the suggestion 656 to a shopping list, or the like. Because other actions can be suggested as noted above, it should be understood that the UI control 660 can be substituted for UI controls that prompt other actions by the user device 102. As such, the illustrated embodiment should not be construed as being limiting in any way.

Figure 6F:
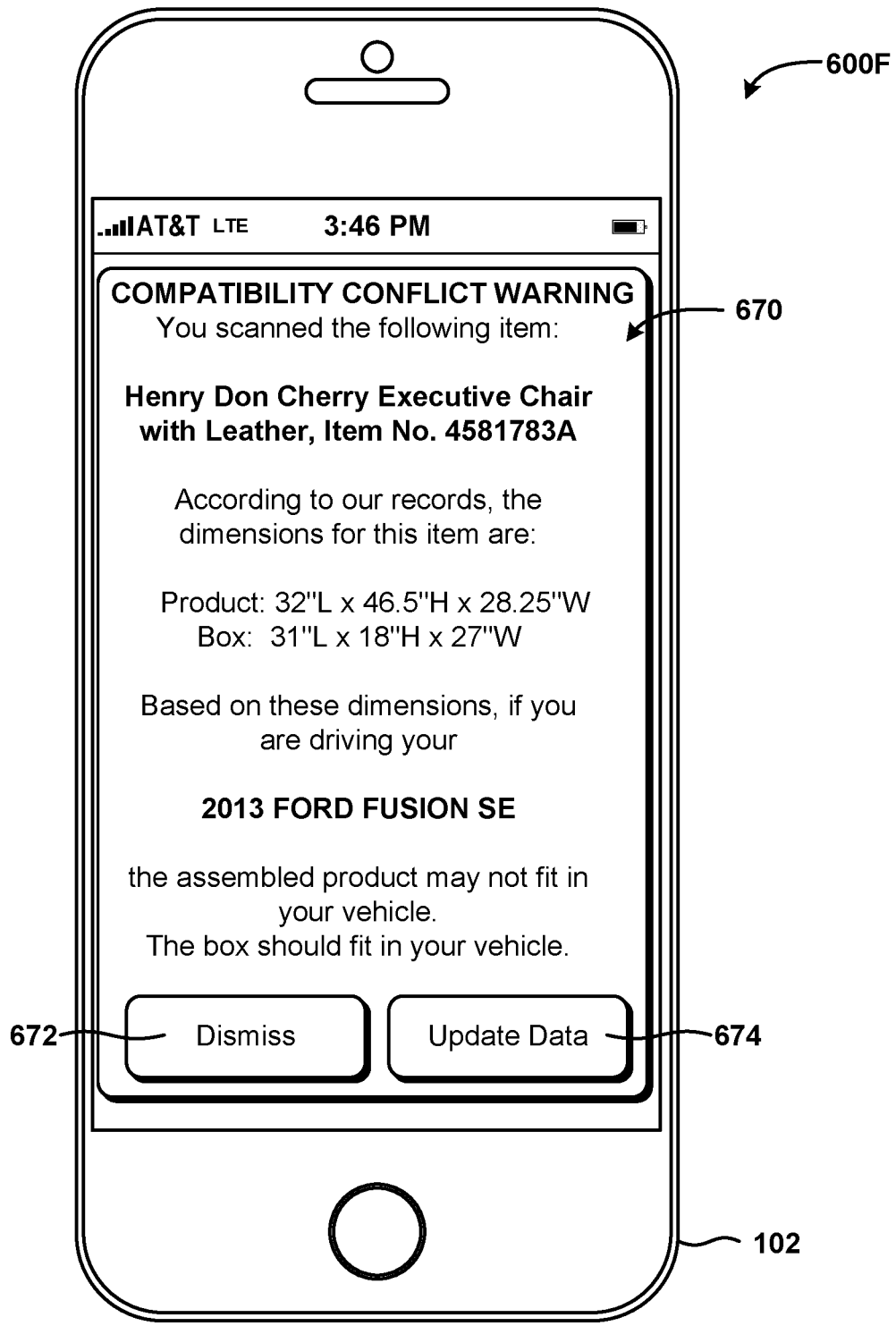

Referring now to FIG. 6F, additional aspects of the concepts and technologies disclosed herein for configuring and/or interacting with a shopping application 108 and/or a shopping service 110 are described in detail. In particular, FIG. 6F shows an illustrative screen display 600F generated by a device such as the user device 102. It should be appreciated that the UI diagram illustrated in FIG. 6F is illustrative of one contemplated example of a UI and therefore should not be construed as being limited in any way. As shown in FIG. 6F, the screen display 600F can be presented on a mobile computing device such as a smartphone, if desired. It should be understood that this example is illustrative, and should not be construed as being limiting in any way. Additionally, it should be understood that the screen display 600F is one contemplated embodiment of the display 138.

The screen display 600F can include a compatibility information window 670. The compatibility information window 670 can be displayed by the user device 102, for example, in response to the shopping application 108 executing at the user device 102 detecting that an item or product has been purchased, searched, scanned, or otherwise interacted with in a manner that suggests the user is considering a purchase. The compatibility information window 670 also can be generated in response to detecting an item or product being added to a shopping list, suggested as an alternative, or the like. Because the compatibility information window 670 can be presented in response to other triggers and/or at other times, it should be understood that this example is illustrative and therefore should not be construed as being limiting in any way.

As shown in FIG. 6F, the compatibility information window 670 can indicate to a user or other entity that an item being purchased, considered for purchase, searched, scanned, or otherwise interacted with is or is not compatible with the user; with the user's office, home, room, or other space; with the user's car, truck, or other mode of transportation; or other entity, place, or the like associated with the user. The item or product may be determined to be incompatible, for example, based upon a size or weight associated with the item, based upon an amount of room or space available at a particular location, based upon ingredients of the item, based upon needs or preferences of the user, combinations thereof, or the like.

Although not included in all embodiments, the compatibility information window 670 can include information that identifies the product or item detected as being considered for purchase and dimensions for the product or item. While the illustrated embodiment of the compatibility information window 670 provides dimensions of the product and/or packaging, it should be understood that the compatibility information window 670 may instead provide a weight or other aspect of the item or product that may or may not be compatible with the user in some way such as ingredients of the item, or the like.

In the illustrated embodiment, the user or other entity can enter data relating to the user's car (e.g., a make, model, year, and/or trim level of the vehicle) at any time and/or as part of a setup process. The user or other entity also can enter the user's carrying weight maximum (e.g., the user may indicate that he or she is comfortable carrying up to thirty pounds, for example); dimensions of a room, home, office, or other space; body dimensions of the user; combinations thereof, or the like. Thus, as shown in FIG. 6F, the compatibility information window 670 can include an indication that the product or item being considered for purchase is or is not compatible with the user. It should be understood that this example is illustrative and therefore should not be construed as being limiting in any way.

In the illustrated embodiment, the compatibility information window 670 indicates that the assembled product or item is incompatible with the user's car, but that the box or package of the unassembled product or item will fit in the user's car. It should be understood that this example is illustrative and therefore should not be construed as being limiting in any way. The screen display 600F can include a UI control 672. Selection of the UI control 672 can cause the user device 102 to hide the compatibility information window 670 and/or to take other actions.

The screen display 600F also can include a UI control 674. Selection of the UI control 674 can cause the user device 102 to present a screen, field, or other display elements to enable a user to update data used to generate the compatibility information window 670. Thus, for example, a user may update stored vehicle information, room dimensions, or the like. Because other actions can be taken instead of dismissing the compatibility information window 670 and/or updating the data used to generate the compatibility information window 670, the illustrated embodiment should not be construed as being limiting in any way.

Figure 6G:
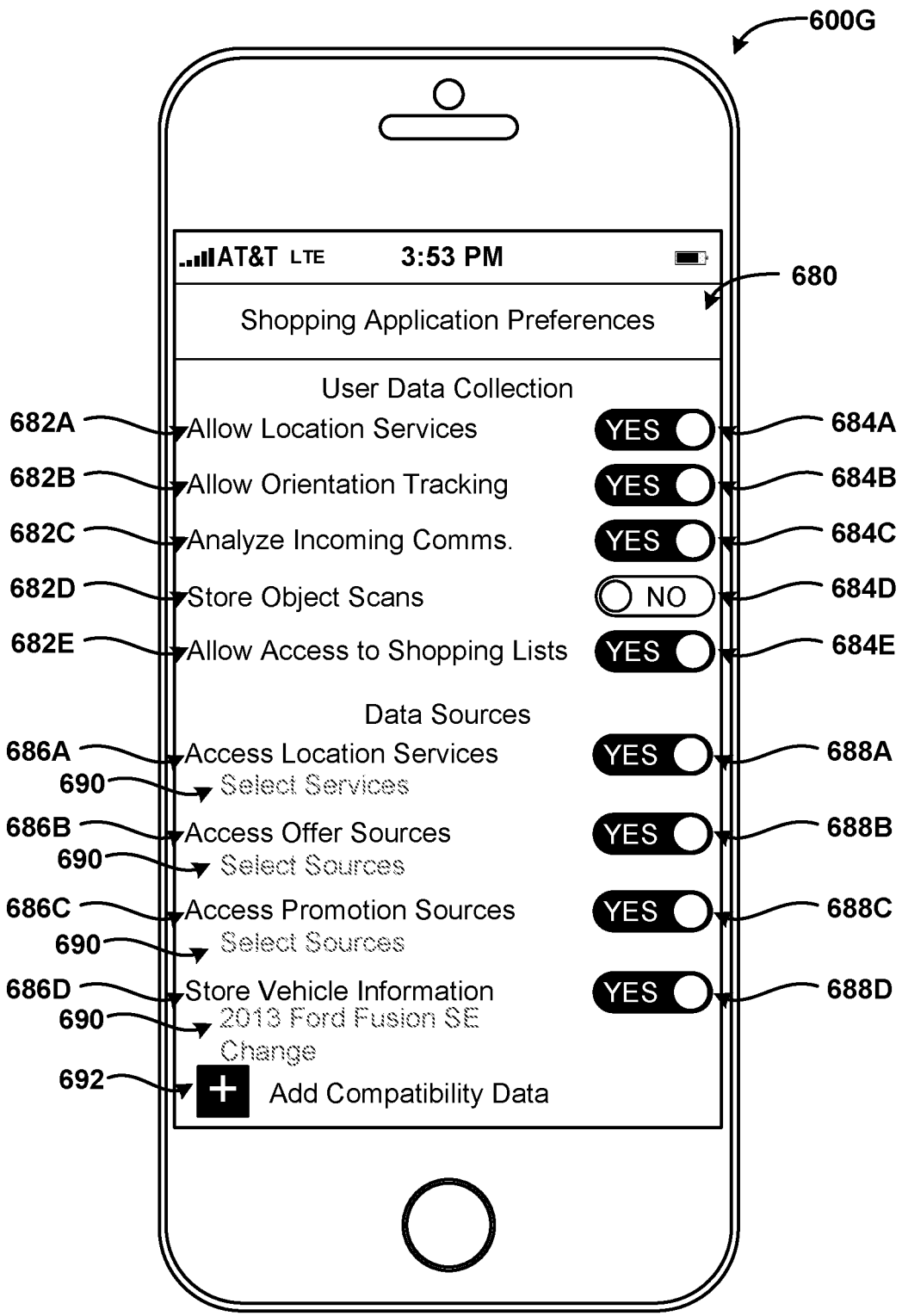

FIG. 6G shows an illustrative screen display 600G, which can be generated by a device such as the user device 102. According to various embodiments, the user device 102 can generate the screen display 600G and/or other screen displays in conjunction with and/or based upon activation of the shopping application 108 and/or via interactions with the shopping service 110 described herein, for example using a web browser, a stand-alone application, combinations thereof, or the like. It should be appreciated that the UI diagram illustrated in FIG. 6G is illustrative of one contemplated example of the UIs that can be generated and/or displayed in accordance with the concepts and technologies disclosed herein, and therefore should not be construed as being limited in any way. Additionally, it should be understood that the screen display 600G is one contemplated embodiment of the display 138.

It should be appreciated that the screen display 600G can be presented, for example, in response to detecting selection of an option to manage options or settings for the shopping application 108 and/or the shopping service 110, in response to an interaction with the shopping application 108 and/or the shopping service 110, upon selecting the UI control 674 illustrated and described in FIG. 6F, based upon other triggers or events, combinations thereof, or the like. Because the screen display 600G illustrated in FIG. 6G can be displayed at additional and/or alternative times, it should be understood that this example is illustrative and therefore should not be construed as being limiting in any way.

The screen display 600G also can include a shopping service or shopping application options display ("options display 680"). The options display 680 can be configured to allow a user or other entity to control various preferences as illustrated and described herein, including but not limited to various application options associated with the shopping application 108, various service options associated with the shopping service 110, and the like, some illustrative examples of which are shown in FIG. 6G. As shown in FIG. 6G, the options display 680 can include a number of data collection options 682A-E (hereinafter collectively and/or generically referred to as "data collection options 682"). Each of the data collection options 682 can have a corresponding data collection selector 684A-E (hereinafter collectively and/or generically referred to as "data collection selectors 684").

A user or other entity can interact with the data collection selectors 684 to specify whether a corresponding data collection option 682 is enabled or disabled, as generally is understood. In the illustrated embodiment, the data collection selector 684A can be used to enable or disable an option to allow the shopping application 108 and/or the shopping service 110 to use location information relating to the user device 102 to provide the functionality illustrated and described herein. The data collection selector 684B can be used to enable or disable an option to allow the shopping application 108 and/or the shopping service 110 to allow tracking of orientation of the user device 102. Thus, if the data collection selector is disabled, the user device 102 may disable or may not access sensor readings associated with one or more orientation sensors as illustrated and described herein. It should be understood that this example is illustrative and therefore should not be construed as being limiting in any way.

The data collection selector 684C can be used to enable or disable an option to allow the shopping application 108 and/or the shopping service 110 to analyze incoming communications 140 at the user device 102 to identify item references as illustrated and described herein. It should be understood from the above description of the communications 140 that additional or alternative options may be provided for allowing monitoring or analysis of outgoing communications 140 and/or communications elsewhere (e.g., not at the user device 102). As such, the illustrated embodiment should not be construed as being limiting in any way.

The data collection selector 684D can be used to enable or disable an option to allow the shopping application 108 and/or the shopping service 110 to store object scans such as barcode scans, label scans, or the like. The data collection selector 684E can be used to enable or disable an option to allow the shopping application 108 and/or the shopping service 110 to access shopping lists stored at or accessible to the user device 102 as illustrated and described herein. Because additional and/or alternative data collection options 682 and/or data collection selectors 684 can be included in the options display 680, it should be understood that these examples are illustrative and therefore should not be construed as being limiting in any way.

The options display 680 also can be configured to allow a user or other entity to control what data sources 122 may be accessed by the shopping application 108 and/or the shopping service 110. In particular, as shown in FIG. 6G, the options display 680 can include a number of data source indicators 686A-D (hereinafter collectively and/or generically referred to as "data source indicators 686"). Each of the data source indicators 686 can have corresponding data source controls 688A-D (hereinafter collectively and/or generically referred to as "data source controls 688").

A user or other entity can interact with the data source controls 688 to specify a binary yes/no, true/false, activated/inactivated, enabled/disabled, or other indicator for a corresponding data source indicator 686. In some embodiments, the binary setting can be replaced with or supplemented by a multi-faceted response field, for example a drop down list that can include two or more choices. For example, the access location services data source indicator 686A can have a dropdown list of settings instead of the illustrated data source control 688A. The dropdown list or other control can include settings of "Always," "Never," and/or other options such as specific times or situations under which access to location services will be allowed, restricted, denied, or other options. Thus, while in the illustrated embodiment the data source controls 688 can provide a binary setting for selection by the user or other entity, it should be understood that this example is illustrative and therefore should not be construed as being limiting in any way.

In the illustrated embodiment, the data source control 688A can be used to activate or deactivate an option to allow the shopping application 108 and/or the shopping service 110 to access one or more location services 130 to determine a location or obtain location data 124 associated with the user device 102. The data source control 688B can be used to activate or deactivate an option to allow the shopping application 108 and/or the shopping service 110 to access one or more offer sources 132 to identify offers 126 as illustrated and described herein. The data source control 688C can be used to activate or deactivate an option to allow the shopping application 108 and/or the shopping service 110 to access one or more promotion sources 134 to obtain promotions 128 as illustrated and described herein. The data source control 688D can be used to activate or deactivate an option to allow the shopping application 108 and/or the shopping service 110 to store vehicle information associated with the user. It can be appreciated that the vehicle information is one embodiment of the compatibility data illustrated and described herein, and as such, other types of compatibility data can be input and/or enabled in the screen display 600G. Because additional and/or alternative data source controls 688 can be included in the options display 680, it should be understood that these examples are illustrative and therefore should not be construed as being limiting in any way.

As shown in FIG. 6G, one or more of the data source indicators 686 can be displayed with a select options control 690. Selection of the select options control 690 associated with a particular data source indicator 686 can cause the user device 102 to display a window or other user interface or user interface element for updating data source options. Thus, a user or other entity can add, change, or delete a data source using one or more of the select options controls 690.

The options display 680 also can include a user interface ("UI") control 692. The UI control 692 can be configured to allow a user or other entity to add a compatibility data source and/or compatibility data. Upon selection or other interaction with the UI control 692, the user device 102 can interact with the shopping application 108 and/or the shopping service 110 to add compatibility data or other information associated with the user, the user device 102, or other entities, locations, or the like. According to some embodiments, selection of the UI control 692 can result in display of a user interface for adding a compatibility data, though not shown in the FIGURES. Because compatibility data can be created or added in additional and/or alternative ways, it should be understood that this example is illustrative and therefore should not be construed as being limiting in any way.

Figure 7:
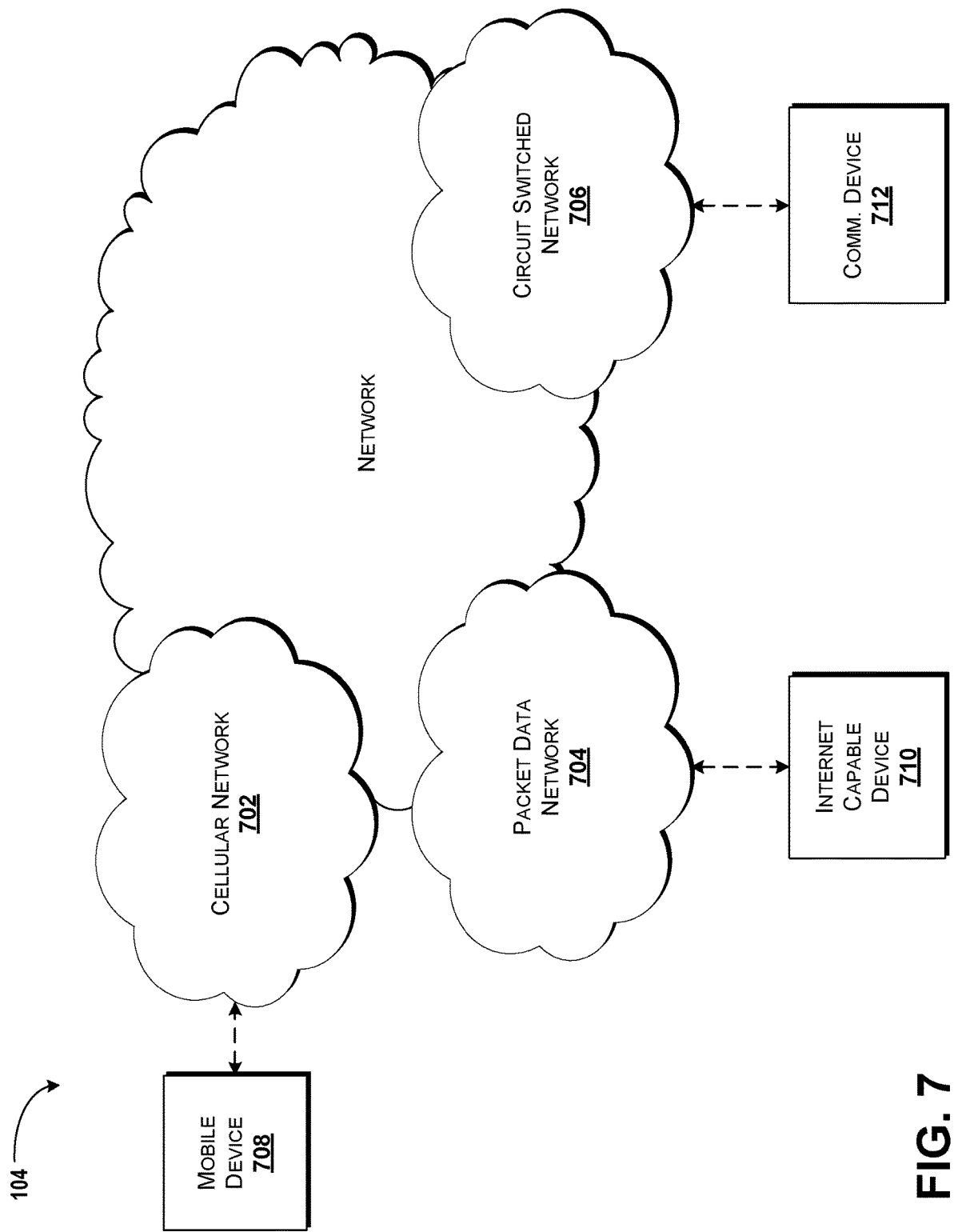
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSDPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
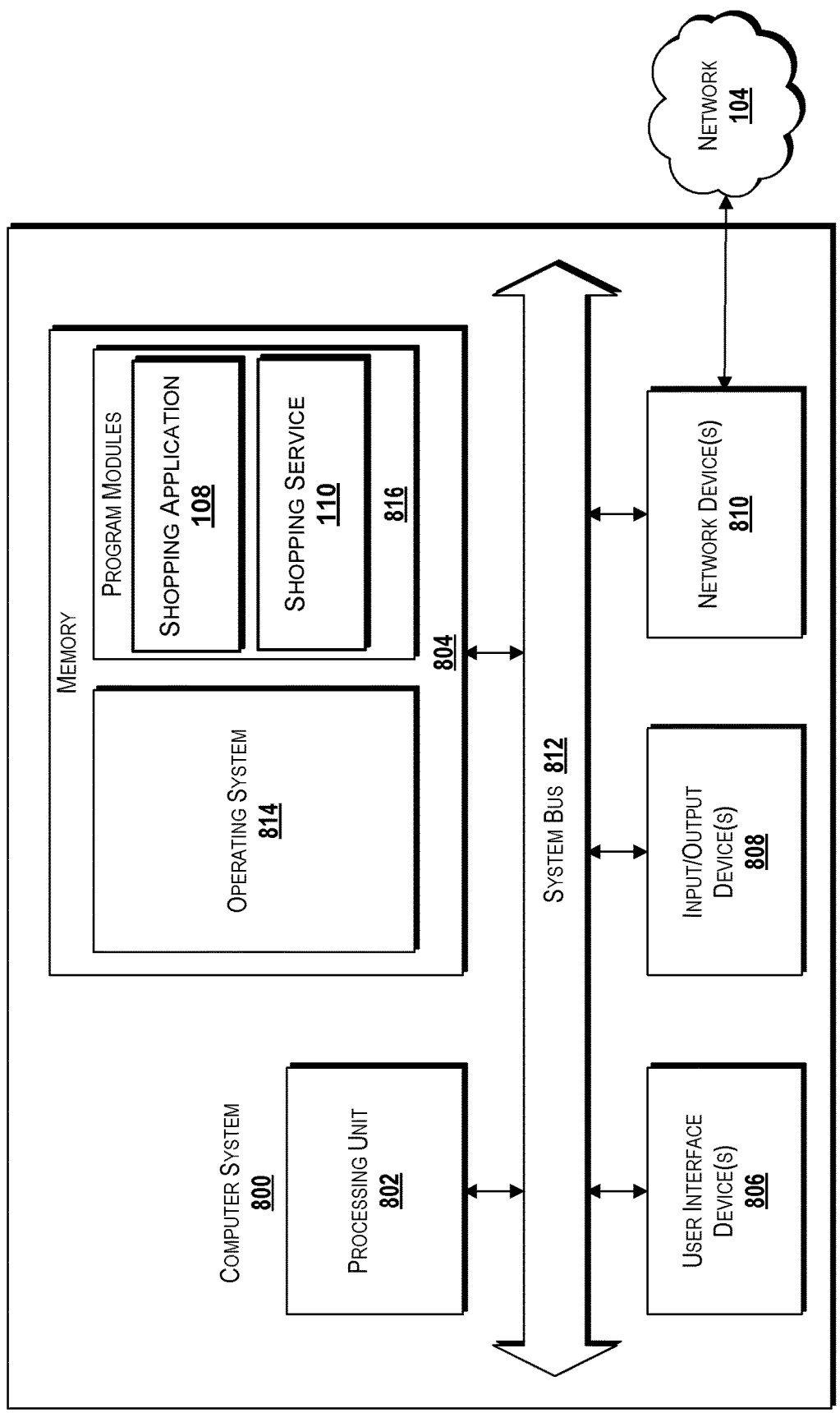
FIG. 8 is a block diagram illustrating an example computer system configured to generate data for providing augmented reality shopping displays, according to some illustrative embodiments of the concepts and technologies described herein.

FIG. 8 is a block diagram illustrating a computer system 800 configured to provide the functionality described herein for presenting augmented reality shopping displays, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the shopping application 108 and/or the shopping service 110. These and/or other programs can be embodied in computer-readable media containing instructions that, when executed by the processing unit 802, perform one or more of the methods 200, 300, 400, 500 described in detail above with respect to FIGS. 2-5. According to embodiments, the program modules 816 may be embodied in hardware, software, firmware, or any combination thereof. Although not shown in FIG. 8, it should be understood that the memory 804 also can be configured to store the user data 114, the shopping data 116, the collected data 120, the display data 136, the display 138, the communication 140, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
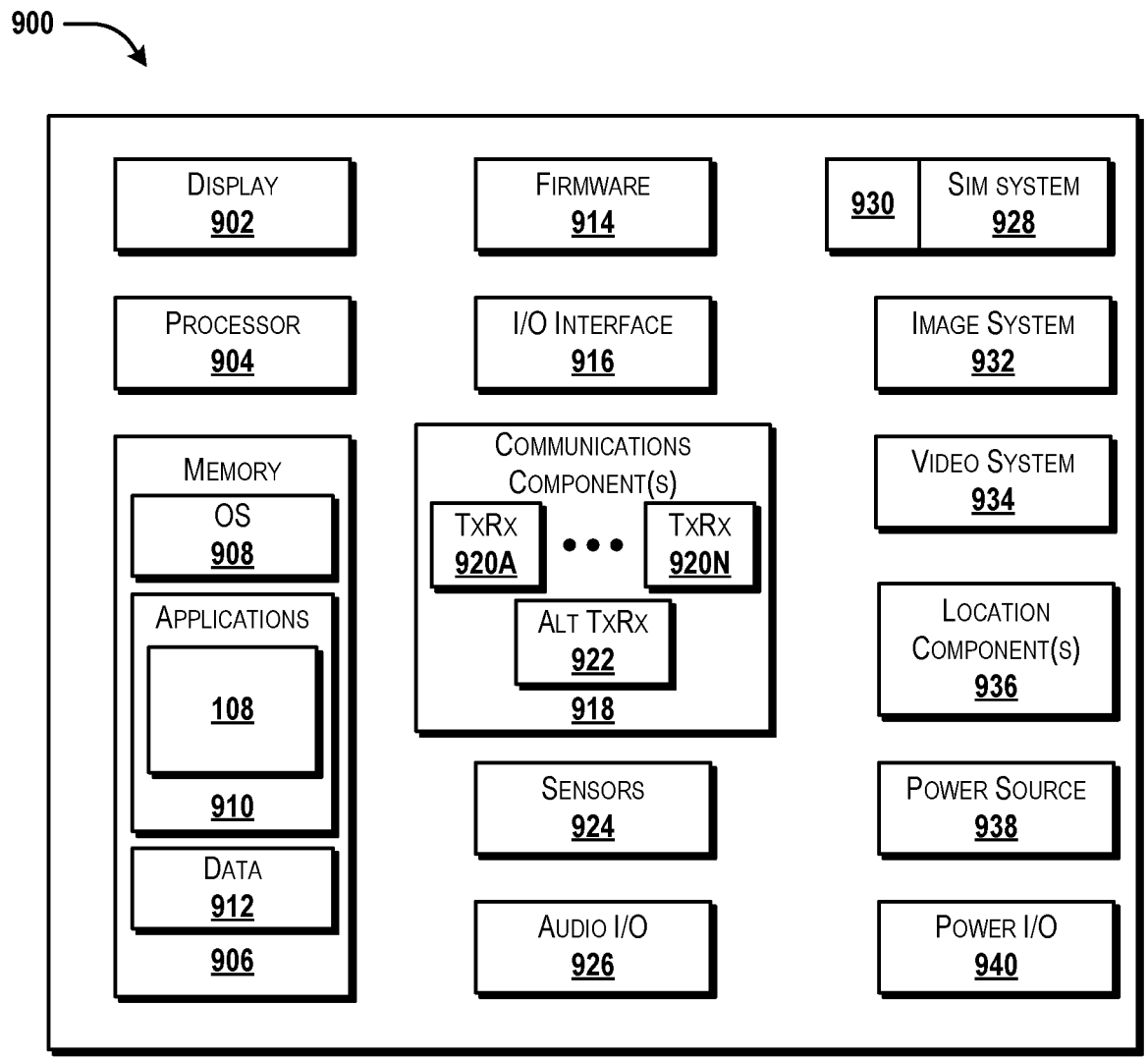
FIG. 9 is a block diagram illustrating an example mobile device configured to interact with a shopping service to provide augmented reality shopping displays, according to some illustrative embodiments of the concepts and technologies described herein.

Turning now to FIG. 9, an illustrative mobile device 900 and components thereof will be described. In some embodiments, the user device 102 described above with reference to FIGS. 1-7 can be configured as and/or can have an architecture similar or identical to the mobile device 900 described herein in FIG. 9. It should be understood, however, that the user device 102 may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements for obtaining preferences, obtaining input from the user, presenting display data 136 (e.g., within a display 138), presenting a shopping route, presenting shopping lists and/or allowing interaction with shopping lists, presenting compatibility information, text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the shopping application 108 and/or functionality such as that illustrated and described herein with reference to the shopping service 110, other computer-executable instructions stored in a memory 906, or the like. In some embodiments, the applications 910 also can include a UI application (not illustrated in FIG. 9).

The UI application can interface with the operating system 908, such as the operating system 106 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering preferences; creating, maintaining, and/or using shopping lists; navigating through a shopping environment; finding alternatives and/or promotions; displaying object or item references; viewing compatibility data; interacting with other applications 910; and otherwise facilitating user interaction with the operating system 908, the applications 910, and/or other types or instances of data 912 that can be stored at the mobile device 900. The data 912 can include, for example, the shopping application 108, the shopping service 110, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, the user data 114, the shopping data 116, the collected data 120, the display data 136, the display 138, the communication 140, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 104 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Based on the foregoing, it should be appreciated that systems and methods for providing augmented reality shopping displays have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, at a computer comprising a processor and from a user device comprising a camera, a request for display data to be displayed at the user device, wherein the user device is associated with a requestor, wherein the user device stores a shopping list, wherein the user device is located at a real environment comprising a store that is associated with a vendor, and the user device captures an image of the store using the camera;
identifying, by the processor and based on an object on the shopping list, an offer source comprising an online retailer;
obtaining, by the processor, an offer from the offer source, wherein the offer comprises a product alternative for the object on the shopping list and a price for purchase of the product alternative from the online retailer;
generating, by the processor, the display data requested by the user device, wherein generating the display data comprises generating a user interface element that represents the product alternative on a virtual shelf, an identification of the online retailer on the virtual shelf, the price charged by the online retailer for the product alternative on the virtual shelf, and an option on the virtual shelf, wherein the option is selectable to purchase the product alternative from the online retailer, wherein generating the display data is based on compatibility data that is used to determine if the product alternative is compatible with a user associated with the user device, wherein the compatibility data identifies a carrying capacity of a vehicle associated with the user, wherein the compatibility data is used to determine if the product alternative will fit in the vehicle, and wherein the compatibility data is based on a vehicle make, model, year and trim level associated with the vehicle and obtained from via the user device;
transmitting, by the processor and directed to the user device, the display data, wherein the user device presents an augmented reality display that comprises the user interface element, which is overlaid on the image of the store, wherein the virtual shelf comprises a pointer that points to a portion of the augmented reality display that corresponds to a location, in the store, of the object;
in response to detecting selection of the option to purchase the product alternative, triggering presentation of a compatibility information window at the user device that indicates whether the product alternative is compatible with the vehicle;
monitoring, by the processor, a message received by the user device from a messaging service of a network, wherein the message includes an item reference comprising a mention of an item;
identifying, by the processor, the item referenced in the message received by the user device, wherein the message was sent by another user device in communication with the messaging service; and
providing, by the processor and to the user device, another user interface that comprises an indication that the message includes the item reference, a suggestion that the item mentioned by the item reference in the message should be added to the shopping list, and a user interface control that, when selected at the user device, causes the user device to add the item mentioned by the item reference in the message to the shopping list.

2. The method of claim 1, wherein the compatibility information window indicates that an assembled product alternative is incompatible with the vehicle and that an unassembled product alternative will fit in the vehicle.

3. The method of claim 2, wherein the compatibility information window comprises a further option to update vehicle information associated with the vehicle.

4. The method of claim 1, wherein the compatibility data further identifies dimensions of a room associated with the user and product dimensions associated with the product alternative, and wherein the compatibility data is used to determine if the product alternative will fit in the room.

5. The method of claim 1, wherein the network comprises a cellular network, wherein the messaging service comprises a short messaging service, and wherein the message comprises a short messaging service message that is received by the user device from a short messaging service center.

6. The method of claim 1, wherein the virtual shelf comprises:
   a first portion that represents the product alternative, the online retailer, and the price on the virtual shelf; and
   a second portion that represents the object on the shopping list and a store price for the object on the shopping list, wherein the second portion comprises the pointer.

7. The method of claim 1, wherein the network comprises a cellular network, wherein the messaging service comprises an email messaging service, and wherein the message comprises an email message that is received by the user device from a mail server.

8. The method of claim 1, wherein the other user interface comprises a reproduced version of the message and a marker that indicates language in the message that corresponds to the item reference.

9. A system comprising:
   a processor; and
   a memory that stores computer-executable instructions that, when executed by the processor, cause the processor to perform operations comprising:
      receiving, from a user device comprising a camera, a request for display data to be displayed at the user device, wherein the user device is associated with a requestor, wherein the user device stores a shopping list, wherein the user device is located at a real environment comprising a store that is associated with a vendor, and the user device captures an image of the store using the camera,
      identifying, based on an object on the shopping list, an offer source comprising an online retailer,
      obtaining an offer from the offer source, wherein the offer comprises a product alternative for the object on the shopping list and a price for purchase of the product alternative from the online retailer,
      generating the display data requested by the user device, wherein generating the display data comprises generating a user interface element that represents the product alternative on a virtual shelf, an identification of the online retailer on the virtual shelf, the price charged by the online retailer for the product alternative on the virtual shelf, and an option on the virtual shelf, wherein the option is selectable to purchase the product alternative from the online retailer, wherein generating the display data is based on compatibility data that is used to determine if the product alternative is compatible with a user associated with the user device, wherein the compatibility data identifies a carrying capacity of a vehicle associated with the user, wherein the compatibility data is used to determine if the product alternative will fit in the vehicle, and wherein the compatibility data is based on a vehicle make, model, year and trim level associated with the vehicle and obtained from via the user device,
      transmitting, directed to the user device, the display data, wherein the user device presents an augmented reality display that comprises the user interface element, which is overlaid on the image of the store, wherein the virtual shelf comprises a pointer that points to a portion of the augmented reality display that corresponds to a location, in the store, of the object,
      in response to detecting selection of the option to purchase the product alternative, triggering presentation of a compatibility information window at the user device that indicates whether the product alternative is compatible with the vehicle,
      monitoring a message received by the user device from a messaging service of a network, wherein the message includes an item reference comprising a mention of an item,
      identifying the item referenced in the message received by the user device, wherein the message was sent by another user device in communication with the messaging service, and
      providing, to the user device, another user interface that comprises an indication that the message includes the item reference, a suggestion that the item mentioned by the item reference in the message should be added to the shopping list, and a user interface control that, when selected at the user device, causes the user device to add the item mentioned by the item reference in the message to the shopping list.

10. The system of claim 9, wherein the network comprises a cellular network, wherein the messaging service comprises a short messaging service, and wherein the message comprises a short messaging service message that is received by the user device from a short messaging service center.

11. The system of claim 9, wherein the network comprises a cellular network, wherein the messaging service comprises an email messaging service, and wherein the message comprises an email message that is received by the user device from a mail server.

12. The system of claim 9, wherein the compatibility information window indicates that an assembled product alternative is incompatible with the vehicle and that an unassembled product alternative will fit in the vehicle, and wherein the compatibility information window comprises a further option to update vehicle information associated with the vehicle.

13. The system of claim 9, wherein the other user interface comprises a reproduced version of the message and a marker that indicates language in the message that corresponds to the item reference.

14. The system of claim 9, wherein the network comprises a cellular network, wherein the messaging service comprises a multimedia messaging service, and wherein the message comprises a multimedia messaging service message that is received by the user device from a multimedia messaging service center.

15. A computer storage medium having computer-executable instructions stored thereon that, when executed by a processor, cause the processor to perform operations comprising:

receiving, from a user device comprising a camera, a request for display data to be displayed at the user device, wherein the user device is associated with a requestor, wherein the user device stores a shopping list, wherein the user device is located at a real environment comprising a store that is associated with a vendor, and the user device captures an image of the store using the camera;

identifying, based on an object on the shopping list, an offer source comprising an online retailer;

obtaining an offer from the offer source, wherein the offer comprises a product alternative for the object on the shopping list and a price for purchase of the product alternative from the online retailer;

generating the display data requested by the user device, wherein generating the display data comprises generating a user interface element that represents the product alternative on a virtual shelf, an identification of the online retailer on the virtual shelf, the price charged by the online retailer for the product alternative on the virtual shelf, and an option on the virtual shelf, wherein the option is selectable to purchase the product alternative from the online retailer, wherein generating the display data is based on compatibility data that is used to determine if the product alternative is compatible with a user associated with the user device, wherein the compatibility data identifies a carrying capacity of a vehicle associated with the user, wherein the compatibility data is used to determine if the product alternative will fit in the vehicle, and wherein the compatibility data is based on a vehicle make, model, year and trim level associated with the vehicle and obtained from via the user device;

transmitting, directed to the user device, the display data, wherein the user device presents an augmented reality display that comprises the user interface element, which is overlaid on the image of the store, wherein the virtual shelf comprises a pointer that points to a portion of the augmented reality display that corresponds to a location, in the store, of the object;

in response to detecting selection of the option to purchase the product alternative, triggering presentation of a compatibility information window at the user device that indicates whether the product alternative is compatible with the vehicle;

monitoring a message received by the user device from a messaging service of a network, wherein the message includes an item reference comprising a mention of an item;

identifying the item referenced in the message received by the user device, wherein the message was sent by another user device in communication with the messaging service; and providing, to the user device, another user interface that comprises an indication that the message includes the item reference, a suggestion that the item mentioned by the item reference in the message should be added to the shopping list, and a user interface control that, when selected at the user device, causes the user device to add the item mentioned by the item reference in the message to the shopping list.

16. The computer storage medium of claim 15, wherein the network comprises a cellular network, wherein the messaging service comprises a short messaging service, and wherein the message is received by the user device from a short messaging service center.

17. The computer storage medium of claim 15, wherein the network comprises a cellular network, wherein the messaging service comprises an email messaging service, and wherein the message comprises an email message that is received by the user device from a mail server.

18. The computer storage medium of claim 15, wherein the compatibility information window indicates that an assembled product alternative is incompatible with the vehicle and that an unassembled product alternative will fit in the vehicle, and wherein the compatibility information window comprises a further option to update vehicle information associated with the vehicle.

19. The computer storage medium of claim 15, wherein the network comprises a cellular network, wherein the messaging service comprises a short messaging service, wherein the message comprises a short messaging service message that is received by the user device from a short messaging service center, and wherein the other user interface comprises a reproduced version of the short messaging service message and an indication that the short messaging service message includes the item reference.

20. The computer storage medium of claim 15, wherein the other user interface comprises a reproduced version of the message and a marker that indicates language in the message that corresponds to the item reference.

* * * * *